United States Patent
Chun et al.

(10) Patent No.: US 10,750,559 B2
(45) Date of Patent: Aug. 18, 2020

(54) USER DEVICE AND DATA TRANSMISSION METHOD THEREFOR, AND NETWORK NODE AND DATA TRANSMISSION METHOD THEREFOR

(71) Applicant: LG ELECTRONICS INC., Seoul (KR)

(72) Inventors: Sungduck Chun, Seoul (KR); Jinsook Ryu, Seoul (KR); Taehun Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/068,657

(22) PCT Filed: Jan. 6, 2017

(86) PCT No.: PCT/KR2017/000218
§ 371 (c)(1),
(2) Date: Jul. 6, 2018

(87) PCT Pub. No.: WO2017/119778
PCT Pub. Date: Jul. 13, 2017

(65) Prior Publication Data
US 2019/0021126 A1    Jan. 17, 2019

Related U.S. Application Data

(60) Provisional application No. 62/275,795, filed on Jan. 7, 2016.

(51) Int. Cl.
*H04W 4/70*    (2018.01)
*H04W 28/02*    (2009.01)
(Continued)

(52) U.S. Cl.
CPC ............ *H04W 76/15* (2018.02); *H04W 4/70* (2018.02); *H04W 28/0215* (2013.01);
(Continued)

(58) Field of Classification Search
CPC ...... H04L 5/0091–0098; H04J 11/0069–0093; H04W 4/50; H04W 4/70;
(Continued)

(56) References Cited

U.S. PATENT DOCUMENTS

2013/0137469 A1* 5/2013 Schmidt ............. H04W 74/006
455/466
2014/0269574 A1 9/2014 Kim et al.
(Continued)

FOREIGN PATENT DOCUMENTS

WO    2014069856    5/2014

OTHER PUBLICATIONS

Samsung, "Miscellaneous corrections (a.o. Sidelink)", 3GPP TSG RAN WG2 Meeting #90, R2-152062, May 2015, 447 pages.
Neul, "RRC procedures for solution 2 in TR 23.720", 3GPP TSG RAN WG2 Meeting #92, R2-156502, Nov. 2015, 4 pages.
PCT International Application No. PCT/KR2017/000218, Written Opinion of the International Searching Authority dated Apr. 14, 2017, 14 pages.
(Continued)

Primary Examiner — Timothy J Weidner
(74) Attorney, Agent, or Firm — Lee Hong Degerman Kang & Waimey

(57) ABSTRACT

User data may be transmitted through a signaling radio bearer (SRB) by using an NAS message. A new SRB different from the existing SRB0, SRB1, and SRB2 may be defined for transmission of the user data. The new SRB may be used to deliver the NAS message containing the user data before security is activated.

12 Claims, 14 Drawing Sheets

(51) Int. Cl.
*H04W 36/00* (2009.01)
*H04W 76/10* (2018.01)
*H04W 76/12* (2018.01)
*H04W 76/15* (2018.01)
*H04W 76/20* (2018.01)
*H04W 76/22* (2018.01)
*H04W 76/27* (2018.01)
*H04W 80/02* (2009.01)
*H04W 88/06* (2009.01)
*H04W 92/10* (2009.01)

(52) U.S. Cl.
CPC ... *H04W 28/0247* (2013.01); *H04W 28/0252* (2013.01); *H04W 36/0022* (2013.01); *H04W 76/10* (2018.02); *H04W 76/12* (2018.02); *H04W 76/20* (2018.02); *H04W 76/22* (2018.02); *H04W 76/27* (2018.02); *H04W 80/02* (2013.01); *H04W 88/06* (2013.01); *H04W 92/10* (2013.01)

(58) Field of Classification Search
CPC .......... H04W 8/22–245; H04W 12/08; H04W 28/02–26; H04W 36/0005–385; H04W 48/02–20; H04W 74/002–0891; H04W 76/10–50; H04W 88/02; H04W 88/06; H04W 88/08–10; H04W 88/16; H04W 92/04; H04W 92/10
See application file for complete search history.

(56) References Cited

U.S. PATENT DOCUMENTS

| | | | |
|---|---|---|---|
| 2015/0043449 A1* | 2/2015 | Bangolae | H04W 4/70 370/329 |
| 2015/0085657 A1* | 3/2015 | Hoehne | H04W 40/12 370/235 |
| 2015/0103793 A1 | 4/2015 | Peng | |
| 2015/0223221 A1 | 8/2015 | Li et al. | |
| 2015/0359018 A1 | 12/2015 | Li et al. | |
| 2015/0373523 A1 | 12/2015 | Jeong et al. | |
| 2017/0196022 A1* | 7/2017 | Yi | H04W 72/04 370/329 |

OTHER PUBLICATIONS

European patent application No. 17736150.8, European search report dated Sep. 3, 2019, 8 pages.
Intel Corporation, "Analysis and way forward in the open aspects of selected SDDTE solutions," 3GPP TSG RAN WG2 Meeting #83, R2-132793, Barcelona Spain, Aug. 19-23, 2013, 10 pages.
LG Electronics, "Introducing SRB3 for NB-IoT", SA WG2 Meeting #114, S2-161550, Apr. 2016, 2 pages.
LG Electronics, "Introducing SRB3 for NB-IOT", 3GPP TSG RAN WG2 Meeting #93bis, R2-162856, Apr. 2016, 2 pages.
Huawei, et al., "EPS Bearer support for NB-IoT", SA WG2 Meeting #113AH, S2-161047, Feb. 2016, 3 pages.
HTC, "RRC aspects in NB-IoT", 3GPP TSG-RAN WG2 Meeting #92, R2-156425, Nov. 2015, 19 pages.

* cited by examiner

FIG. 5
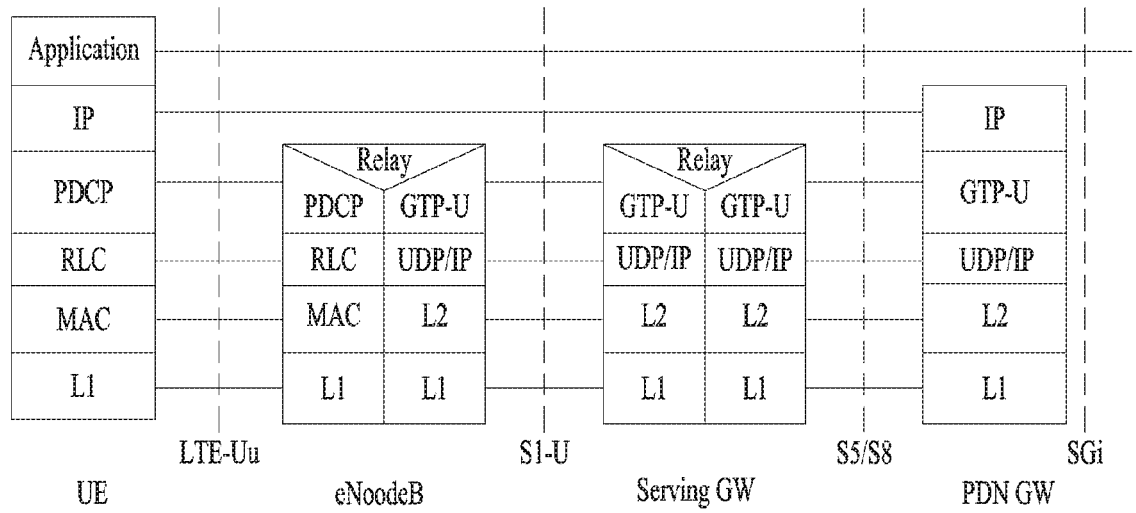
(a) UE-P-GW user plane with E-UTRAN
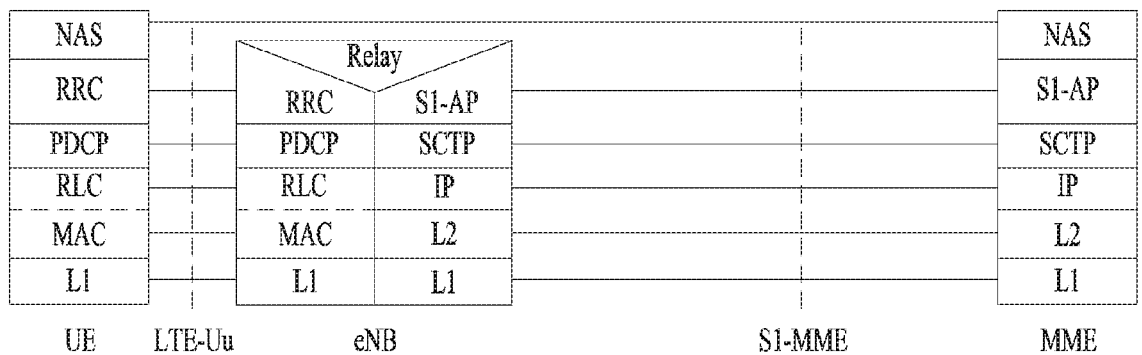
(b) Control Plane UE-MME

FIG. 14

| | | |
|---|---|---|
| (a) | The amount of RRC/NAS control information | The amount of user data |

| | | |
|---|---|---|
| (b) | Size of RRC message | The amount of user data |

| | | |
|---|---|---|
| (c) | Size of RRC message | Presence or absence of user data |

| | | | |
|---|---|---|---|
| (d) | Size of RRC message | User data priority information | The amount of data corresponding to user priority information |

| | | | |
|---|---|---|---|
| (e) | The amount of RRC/NAS control information | User data priority information | The amount of data corresponding to user priority information |

USER DEVICE AND DATA TRANSMISSION METHOD THEREFOR, AND NETWORK NODE AND DATA TRANSMISSION METHOD THEREFOR

CROSS-REFERENCE TO RELATED APPLICATIONS

This application is the National Stage filing under 35 U.S.C. 371 of International Application No. PCT/KR2017/000218, filed on Jan. 6, 2017, which claims the benefit of U.S. Provisional Application No. 62/275,795, filed on Jan. 7, 2016, the contents of which are all hereby incorporated by reference herein in their entirety.

TECHNICAL FIELD

The present invention relates to a wireless communication system, and more particularly, to a method and apparatus for receiving/transmitting data.

BACKGROUND ART

With appearance and spread of machine-to-machine (M2M) communication and a variety of devices such as smartphones and tablet PCs and technology demanding a large amount of data transmission, data throughput needed in a cellular network has rapidly increased. To satisfy such rapidly increasing data throughput, carrier aggregation technology, cognitive radio technology, etc. for efficiently employing more frequency bands and multiple input multiple output (MIMO) technology, multi-base station (BS) cooperation technology, etc. for raising data capacity transmitted on limited frequency resources have been developed.

In addition, a communication environment has evolved into increasing density of nodes accessible by a user at the periphery of the nodes. A node refers to a fixed point capable of transmitting/receiving a radio signal to/from the UE through one or more antennas. A communication system including high-density nodes may provide a better communication service to the UE through cooperation between the nodes.

DISCLOSURE

Technical Problem

Due to introduction of new radio communication technology, the number of user equipments (UEs) to which a BS should provide a service in a prescribed resource region increases and the amount of data and control information that the BS should transmit to the UEs increases. Since the amount of resources available to the BS for communication with the UE(s) is limited, a new method in which the BS efficiently receives/transmits uplink/downlink data and/or uplink/downlink control information using the limited radio resources is needed.

With the development of smart devices, a new method for efficiently transmitting/receiving a small amount of data or infrequently occurring data is required.

The technical objects that can be achieved through the present invention are not limited to what has been particularly described hereinabove and other technical objects not described herein will be more clearly understood by persons skilled in the art from the following detailed description.

Technical Solution

User data may be transmitted through a signaling radio bearer (SRB) using a non-access stratum (NAS) message. A new SRB different from legacy SRB0, SRB1, and SRB2 may be defined for transmission of the user data. The new SRB may be used to transfer the NAS message containing the user data before security is activated.

According to an aspect of the present invention, provided herein is a method of transmitting data by a user equipment in a wireless communication system. The method may include transmitting a radio resource control (RRC) connection request message; receiving an RRC connection setup message; and transmitting a non-access stratum (NAS) message including user data. Before security is activated, the NAS message may be transmitted through a specific signaling radio bearer (SRB) established for transmission of the NAS message.

According to another aspect of the present invention, provided herein is a user equipment for transmitting data in a wireless communication system. The user equipment may include a radio frequency (RF) unit, and a processor configured to control the RF unit. The processor may be configured to control the RF unit to transmit a radio resource control (RRC) connection request message; and control the RF unit to transmit a non-access stratum (NAS) message including user data. Before security is activated, the processor may control the RF unit to transmit the NAS message through a specific signaling radio bearer (SRB) established for transmission of the NAS message.

According to another aspect of the present invention, provided herein is a method of receiving data by a network node from a user equipment in a wireless communication system. The method may include receiving a radio resource control (RRC) connection request message; transmitting an RRC connection setup message; and receiving a non-access stratum (NAS) message including user data. Before security is activated, the NAS message may be received through a specific signaling radio bearer (SRB) established for transmission of the NAS message According to another aspect of the present invention, provided herein is a network node for receiving data from a user equipment in a wireless communication system. The network node may include a radio frequency (RF) unit, and a processor configured to control the RF unit. The processor may be configured to control the RF unit to receive a radio resource control (RRC) connection request message; control the RF unit to transmit an RRC connection setup message; and control the RF unit to receive a non-access stratum (NAS) message including user data. Before security is activated, the NAS message may be received through a specific signaling radio bearer (SRB) established for transmission of the NAS message.

In each aspect of the present invention, the specific SRB may be a new SRB different from signaling radio bearer 1 (SRB1), signaling radio bearer 2 (SRB2), and signaling radio bearer 0 (SRB0).

In each aspect of the present invention, the NAS message may be transmitted/received after the RRC connection setup message is received/transmitted.

In each aspect of the present invention, the RRC connection request message may be transmitted/received through the SRB0.

In each aspect of the present invention, the NAS message may be contained in an RRC message to be transmitted/received through the specific SRB.

In each aspect of the present invention, the user equipment for establishing the specific SRB may support narrowband Internet of things (NB-IoT).

In each aspect of the present invention, the specific SRB may be established according to configuration information included in the RRC connection setup message In each aspect of the present invention, after security is activated and if the SRB2 is present, the NAS message may be transmitted/received through the SRB2.

The above technical solutions are merely some parts of the embodiments of the present invention and various embodiments into which the technical features of the present invention are incorporated can be derived and understood by persons skilled in the art from the following detailed description of the present invention.

Advantageous Effects

According to the present invention, uplink/downlink signals can be efficiently transmitted/received. Therefore, overall throughput of a radio communication system can be improved.

According to the present invention, a low-complexity/low-cost UE can communicate with the network while maintaining backward compatibility with the legacy system.

According to the present invention, it is possible to implement a low-complexity/low-cost UE.

According to the present invention, a UE can communicate with the network in narrowband.

According to the present invention, a small amount of data can be efficiently transmitted/received.

According to the present invention, in a communication system optimized to support data transmission/reception of an IoT device, transmission/reception services of data having different types and importance degrees can be effectively provided to different UEs.

It will be appreciated by persons skilled in the art that that the effects that can be achieved through the present invention are not limited to what has been particularly described hereinabove and other advantages of the present invention will be more clearly understood from the following detailed description.

BRIEF DESCRIPTION OF THE DRAWINGS

The accompanying drawings, which are included to provide a further understanding of the invention, illustrate embodiments of the invention and together with the description serve to explain the principle of the invention.

FIG. 5 is a diagram illustrating LTE (Long Term Evolution) protocol stacks for a user plane and a control plane.

FIG. 14 illustrates special formats for a BSR.

MODE FOR CARRYING OUT THE INVENTION

Figure 1:
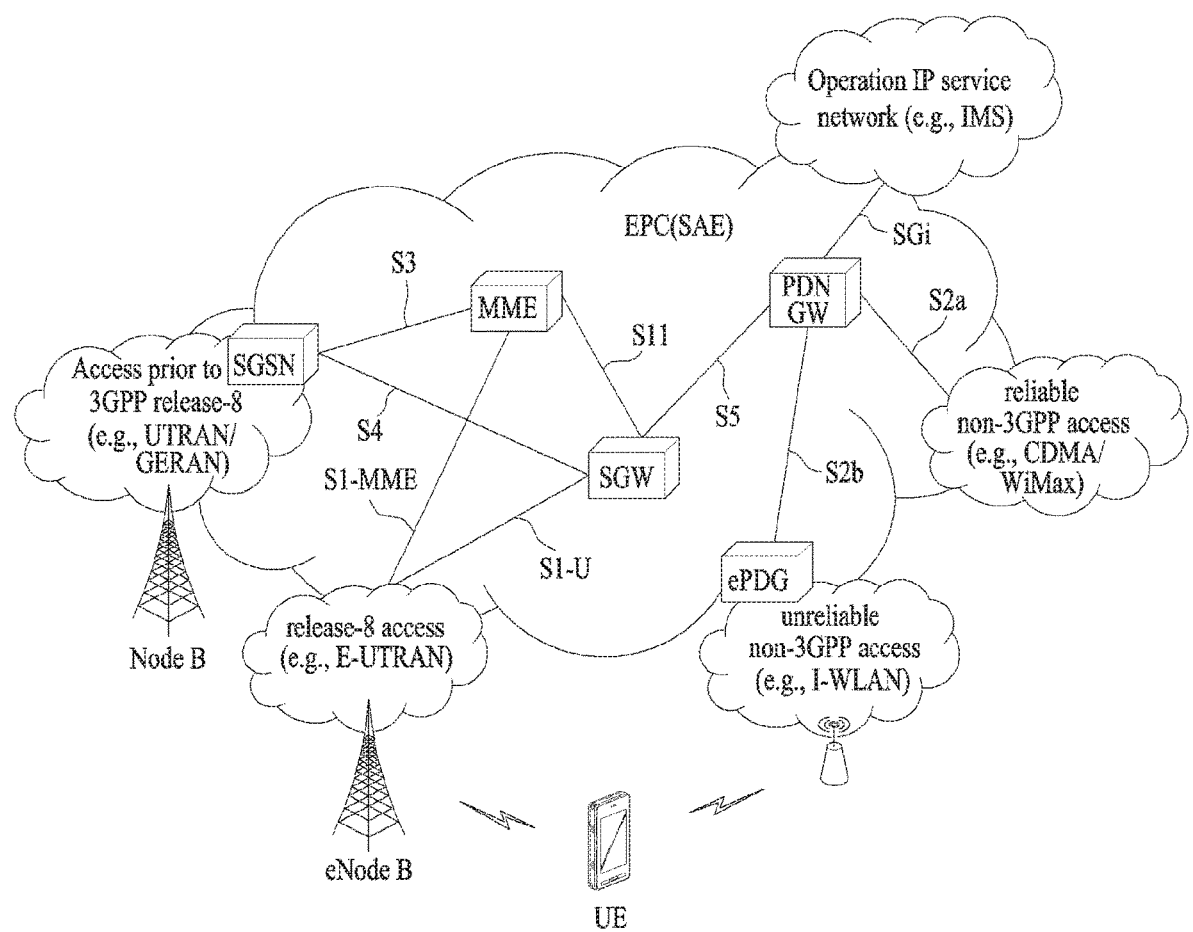
FIG. 1 is a schematic diagram showing the structure of an evolved packet system (EPS) including an evolved packet core (EPC).

Although the terms used in the present invention are selected from generally known and used terms while considering functions of the present invention, they may vary according to intention or customs of those skilled in the art or emergence of new technology. Some of the terms mentioned in the description of the present invention may have been selected by the applicant at his or her discretion, and in such cases the detailed meanings thereof will be described in relevant parts of the description herein. Thus, the terms used in this specification should be interpreted based on the substantial meanings of the terms and the whole content of this specification rather than their simple names or meanings.

The embodiments of the present invention described hereinbelow are combinations of elements and features of the present invention. The elements or features may be considered selective unless mentioned otherwise. Each element or feature may be practiced without being combined with other elements or features. Further, an embodiment of the present invention may be constructed by combining parts of the elements and/or features. Operation orders described in embodiments of the present invention may be rearranged. Some constructions or features of any one embodiment may be included in another embodiment and may be replaced with corresponding constructions or features of another embodiment.

In the description of the attached drawings, a detailed description of known procedures or steps of the present invention will be avoided lest it should obscure the subject matter of the present invention. In addition, procedures or steps that could be understood to those skilled in the art will not be described either.

Throughout the specification, when a certain portion "includes" or "comprises" a certain component, this indicates that other components are not excluded and may be further included unless otherwise noted. The terms "unit", "-or/er" and "module" described in the specification indicate a unit for processing at least one function or operation, which may be implemented by hardware, software or a combination thereof. In addition, the terms "a" (or "an"), "one", "the", etc. may include a singular representation and a plural representation in the context of the present invention (more particularly, in the context of the following claims) unless indicated otherwise in the specification or unless context clearly indicates otherwise.

The embodiments of the present invention can be supported by standard specifications disclosed for at least one of wireless access systems including an institute of electrical and electronics engineers (IEEE) 802.xx, a 3rd generation partnership project (3GPP) system, a 3GPP Long Term Evolution (3GPP LTE) system, and a 3GPP2 system. That is, steps or parts that are not described to clarify the technical features of the present invention may be explained with reference to the above standard specifications.

In addition, all terms set forth herein may be explained by the above standard specifications. For example, one or more of standard specifications, such as 3GPP TS 36.211, 3GPP TS 36.213, 3GPP TS 36.321, 3GPP TS 36.322, 3GPP TS 36.323, 3GPP TS 36.331, 3GPP TS 23.401, 3GPP TS 24.301, 3GPP TS 23.228, 3GPP TS 29.228, 3GPP TS 23.218, 3GPP TS 22.011, and 3GPP TS 36.413 may be referenced.

Reference will now be made in detail to the embodiments of the present disclosure with reference to the accompanying drawings. The detailed description, which will be given below with reference to the accompanying drawings, is intended to explain exemplary embodiments of the present disclosure, rather than to show the only embodiments that can be implemented according to the invention.

Specific terms used for the embodiments of the present invention are provided to aid in understanding of the present invention. These specific terms may be replaced with other terms within the scope and spirit of the present invention.

The terms used in this specification are defined as follows.

IMS (IP Multimedia Subsystem or IP Multimedia Core Network Subsystem): An architectural framework for providing standardization for delivery of voice or other multimedia services over Internet protocol (IP).

UMTS (Universal Mobile Telecommunications System): Global System for Mobile Communication (GSM)-based 3rd generation mobile communication technology developed by 3GPP.

EPS (Evolved Packet System): A network system configured by an EPC (Evolved Packet Core), which is an Internet Protocol (IP)-based packet switched (PS) core network and an access network such as LTE, UTRAN, etc. The EPS is evolved from UMT.

NodeB: A base station of GERAN/UTRAN which is installed outdoors and has coverage of a macro cell scale.

eNodeB/eNB: A base station of E-UTRAN which is installed outdoors and has coverage of a macro cell scale.

UE (User Equipment): A user equipment. The UE may be referred to as a terminal, ME (Mobile Equipment), MS (Mobile Station), or the like. The UE may be a portable device such as a notebook computer, cellular phone, PDA (Personal Digital Assistant), smartphone, and multimedia device, or may be a nonportable device such as a PC (Personal Computer) and vehicle-mounted device. The term UE or terminal in the description of MTC may refer to an MTC device.

HNB (Home NodeB): A base station of a UMTS network. The HNB is installed indoors and has coverage of a micro cell scale.

HeNB (Home eNodeB): A base station of an EPS network. The HeNB is installed indoors and has coverage of a micro cell scale.

MME (Mobility Management Entity): A network node of the EPS network performing functions of Mobility Management (MM) and Session Management (SM).

PDN-GW (Packet Data Network-Gateway)/PGW/P-GW: A network node of the EPS network performing functions of UE IP address allocation, packet screening and filtering, and charging data collection.

SGW (Serving Gateway)/S-GW: A network node of the EPS network performing functions of mobility anchor, packet routing, idle mode packet buffering, and triggering of the MME paging the UE.

PCRF (Policy and Charging Rule Function): A network node of the EPS network making a policy decision for dynamically applying a differentiated QoS and charging policy on a service flow basis.

OMA DM (Open Mobile Alliance Device Management): A protocol designed for management of mobile devices such as a cellular phone, a PDA, and a portable computer, that performs functions of device configuration, firmware upgrade, and error report.

OAM (Operation Administration and Maintenance): A group of network management functions that provides network defect indication, performance information, and data and diagnosis functions.

NAS (Non-Access Stratum): An upper stratum of a control plane between the UE and the MME. The NAS is a functional layer for signaling between a UE and a core network and exchange of a traffic message between the UE and the core network in LTE/UMTS protocol stack. The NAS mainly functions to support UE mobility and a session management procedure for establishing and maintaining IP connection between a UE and a P-GW.

EMM (EPS Mobility Management): A sub-layer of a NAS layer, that may be in either an "EMM-Registered" or "EMM-Deregistered" state depending on whether a UE is attached to or detached from a network.

ECM (EMM Connection Management) connection: A signaling connection for exchange of a NAS message, established between the UE and an MME. The ECM connection is a logical connection consisting of an RRC connection between the UE and an eNB and an S1 signaling connection between the eNB and the MME. If the ECM connection is established/terminated, the RRC connection and the S1 signaling connection are all established/terminated as well. To the UE, an established ECM connection means having an RRC connection established with the eNB and, to the MME, the established ECM connection means having an S1 signaling connection established with the eNB. Depending on whether a NAS signaling connection, i.e., the ECM connection, is established, ECM may be in either "ECM-Connected" or "ECM-Idle" state.

AS (Access-Stratum): This includes a protocol stack between the UE and a wireless (or access) network and is in charge of data and network control signal transmission.

NAS configuration MO (Management Object): An MO used in the process of configuring parameters related to NAS functionality for the UE.

PDN (Packet Data Network): A network where a server (e.g., an MMS (Multimedia Messaging Service) server, a WAP (Wireless Application Protocol) server, etc.) supporting a specific service is located.

PDN connection: A logical connection between a PDN and a UE represented by one IP address (one IPv4 address and/or one IPv6 prefix).

APN (Access Point Name): A text sequence for indicating or identifying a PDN. A requested service or network is accessed through a specific P-GW. The APN means a predefined name (text sequence) in a network so as to discover this P-GW. (e.g., internet.mnc012.mcc345.gprs).

RAN (Radio Access Network): A unit including a NodeB, an eNodeB and an RNC (Radio Network Controller) for controlling the NodeB and the eNodeB in a 3GPP network. The RAN is present between UEs and provides connection to the core network.

HLR (Home Location Register)/HSS (Home Subscriber Server): A database containing subscriber information of a 3GPP network. The HSS can perform functions such as configuration storage, identity management and user state storage.

PLMN (Public Land Mobile Network): A network configured for the purpose of providing mobile communication services to individuals. This network can be configured per operator.

ANDSF (Access Network Discovery and Selection Function): One network entity that provides a policy to discover and select access that the UE can use with respect to each service provider.

EPC path (or infrastructure data path): A user plane communication path through an EPC.

E-RAB (E-UTRAN Radio Access Bearer): Concatenation of an S1 bearer and a data radio bearer corresponding to the S1 bearer. If the E-RAB is present, there is one-to-one mapping between the E-RAB and an EPS bearer of a NAS.

GTP (GPRS Tunneling Protocol): A group of IP-based communication protocols used to carry a general packet radio service (GPRS) within GSM, UMTS, and LTE networks. In 3GPP architectures, GTP and proxy mobile IPv6 based interfaces are specified on various interface points. The GTP can be decomposed into some protocols (e.g., GTP-C, GTP-U, and GTP'). GTP-C is used within a GPRS core network for signaling between gateway GPRS support nodes (GGSN) and serving GPRS support nodes (SGSN). GTP-C allows the SGSN to activate a session on a user's behalf (e.g., PDN context activation), deactivate the same session, adjust quality of service parameters, or update a session for a subscriber that has just arrived from another SGSN. GTP-U is used to carry user data within the GPRS core network and between a radio access network and a core network.

The EPC is a core element of system architecture evolution (SAE) for improving performance of 3GPP technology. SAE corresponds to a research project for determining a network structure supporting mobility between various types of networks. For example, SAE aims to provide an optimized packet-based system for supporting various radio access technologies and providing an enhanced data transmission capability.

Specifically, the EPC is a core network of an IP mobile communication system for 3GPP LTE and can support real-time and non-real-time packet-based services. In conventional mobile communication systems (i.e. second-generation or third-generation mobile communication systems), functions of a core network are implemented through a circuit-switched (CS) sub-domain for voice and a packet-switched (PS) sub-domain for data. However, in a 3GPP LTE system which is evolved from the third generation communication system, CS and PS sub-domains are unified into one IP domain. That is, in 3GPP LTE, connection of terminals having IP capability can be established through an IP-based business station (e.g., an eNodeB (evolved Node B)), EPC, and an application domain (e.g., IMS). That is, the EPC is an essential structure for end-to-end IP services.

The EPC may include various components. FIG. 1 shows some of the components, namely, a serving gateway (SGW), a packet data network gateway (PDN GW), a mobility management entity (MME), a serving GPRS (general packet radio service) supporting node (SGSN) and an enhanced packet data gateway (ePDG).

The SGW (or S-GW) operates as a boundary point between a radio access network (RAN) and a core network and maintains a data path between an eNodeB and the PDN GW. When. When a terminal moves over an area served by an eNodeB, the SGW functions as a local mobility anchor point. That is, packets. That is, packets may be routed through the SGW for mobility in an evolved UMTS terrestrial radio access network (E-UTRAN) defined after 3GPP release-8. In addition, the SGW may serve as an anchor point for mobility of another 3GPP network (a RAN defined before 3GPP release-8, e.g., UTRAN or GERAN (global system for mobile communication (GSM)/enhanced data rates for global evolution (EDGE) radio access network).

The PDN GW (or P-GW) corresponds to a termination point of a data interface for a packet data network. The PDN GW may support policy enforcement features, packet filtering and charging support. In addition, the PDN GW may serve as an anchor point for mobility management with a 3GPP network and a non-3GPP network (e.g., an unreliable network such as an interworking wireless local area network (I-WLAN) and a reliable network such as a code division multiple access (CDMA) or WiMax network.

Although the SGW and the PDN GW are configured as separate gateways in the example of the network structure of FIG. 1, the two gateways may be implemented according to a single gateway configuration option.

The MME performs signaling and control functions for supporting access of a UE for network connection, network resource allocation, tracking, paging, roaming and handover. The MME controls control plane functions associated with subscriber and session management. The MME manages numerous eNodeBs and signaling for selection of a conventional gateway for handover to other 2G/3G networks. In addition, the MME performs security procedures, terminal-to-network session handling, idle terminal location management, etc.

The SGSN handles all packet data such as mobility management and authentication of a user for other 3GPP networks (e.g., a GPRS network).

The ePDG serves as a security node for a non-3GPP network (e.g., an I-WLAN, a Wi-Fi hotspot, etc.).

As described above with reference to FIG. 1, a terminal having IP capabilities may access an IP service network (e.g., an IMS) provided by an operator via various elements in the EPC not only based on 3GPP access but also on non-3GPP access.

Additionally, FIG. 1 shows various reference points (e.g. S1-U, S1-MME, etc.). In 3GPP, a conceptual link connecting two functions of different functional entities of an E-UTRAN and an EPC is defined as a reference point. Table 1 is a list of the reference points shown in FIG. 1. Various reference points may be present in addition to the reference points in Table 1 according to network structures.

TABLE 1

| Reference Point | Description |
| --- | --- |
| S1-MME | Reference point for the control plane protocol between E-UTRAN and MME. |
| S1-U | Reference point between E-UTRAN and Serving GW for the per bearer user plane tunneling and inter eNB path switching during handover. |
| S3 | It enables user and bearer information exchange for inter 3GPP access network mobility in idle and/or active state. This reference point can be used intra-PLMN or inter-PLMN (e.g. in the case of Inter-PLMN HO). |
| S4 | It provides related control and mobility support between GPRS Core and the 3GPP Anchor function of Serving GW. In addition, if Direct Tunnel is not established, it provides the user plane tunnelling. |
| S5 | It provides user plane tunnelling and tunnel management between Serving GW and PDN GW. It is used for Serving GW relocation due to UE mobility and if the Serving GW needs to connect to a non-collocated PDN GW for the required PDN connectivity. |
| S11 | Reference point between MME and Serving GW. |
| SGi | It is the reference point between the PDN GW and the packet data network. Packet data network may be an operator external public or private packet data network or an intra operator packet data network, e.g. for provision of IMS services. This reference point corresponds to Gi for 3GPP accesses.) |

Among the reference points shown in FIG. 1, S2a and S2b correspond to non-3GPP interfaces. S2a is a reference point which provides reliable non-3GPP access and related control and mobility support between PDN GWs to a user plane. S2b is a reference point which provides related control and mobility support between the ePDG and the PDN GW to the user plane.

Figure 2:
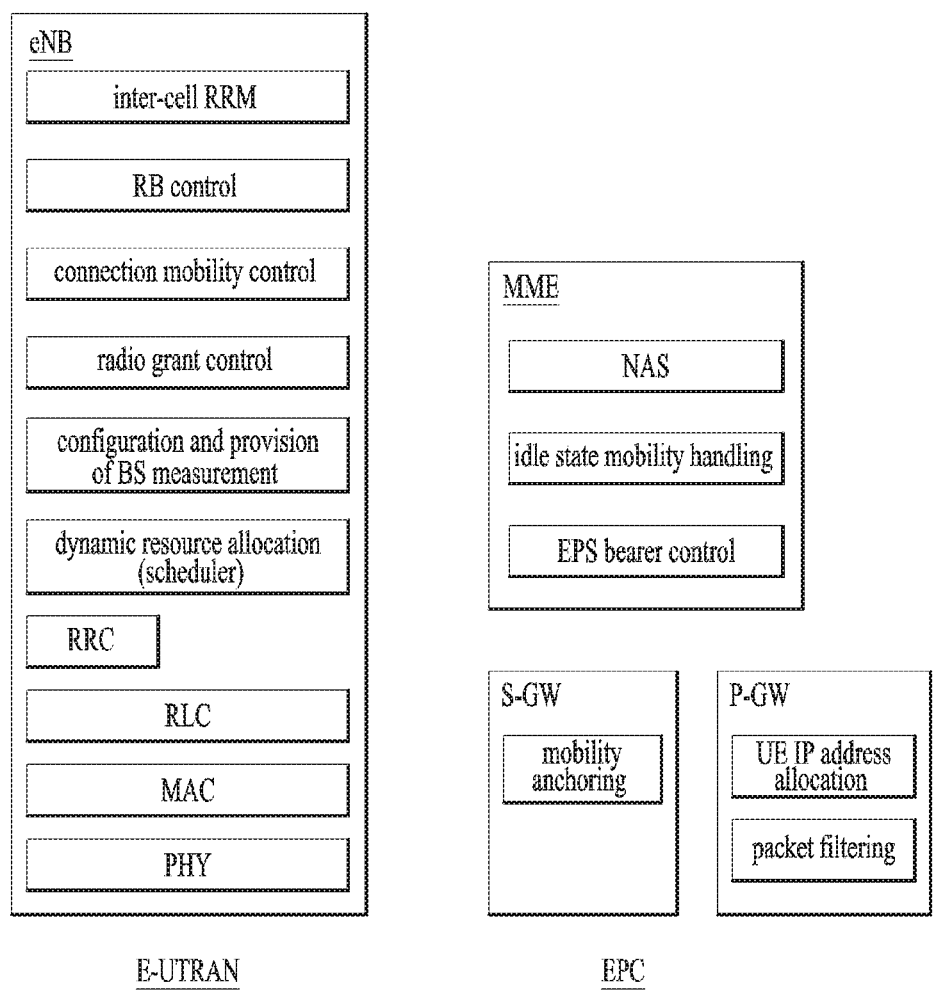
FIG. 2 is a diagram exemplarily illustrating architectures of a general E-UTRAN and EPC.

FIG. 2 is a diagram exemplarily illustrating architectures of a typical E-UTRAN and EPC.

As shown in the figure, while radio resource control (RRC) connection is activated, an eNodeB may perform routing to a gateway, scheduling transmission of a paging message, scheduling and transmission of a broadcast channel (BCH), dynamic allocation of resources to a UE on uplink and downlink, configuration and provision of eNodeB measurement, radio bearer control, radio admission control, and connection mobility control. In the EPC, paging generation, LTE_IDLE state management, ciphering of the user plane, SAE bearer control, and ciphering and integrity protection of NAS signaling.

Figure 3:
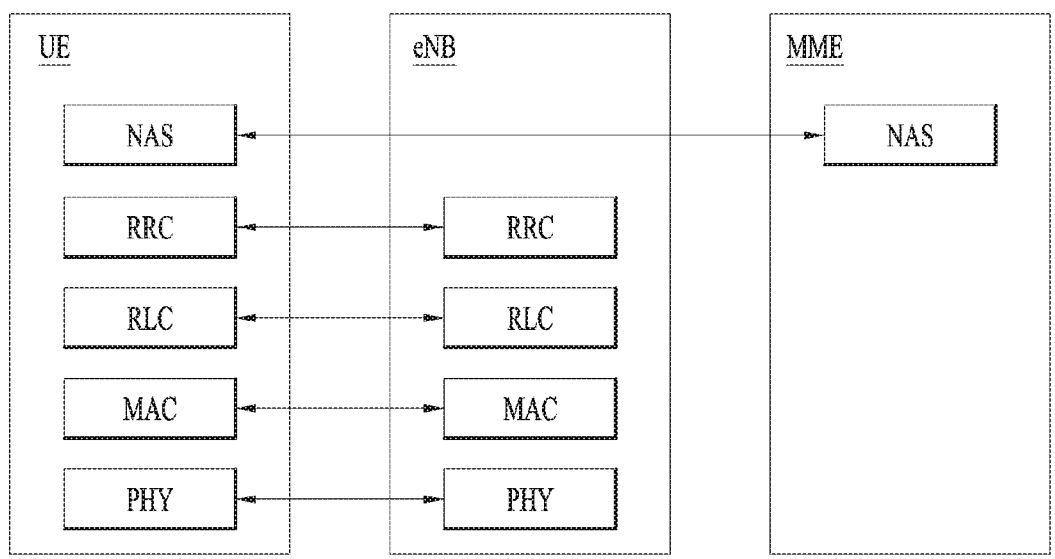
FIG. 3 is a diagram exemplarily illustrating the structure of a radio interface protocol in a control plane.
Figure 4:
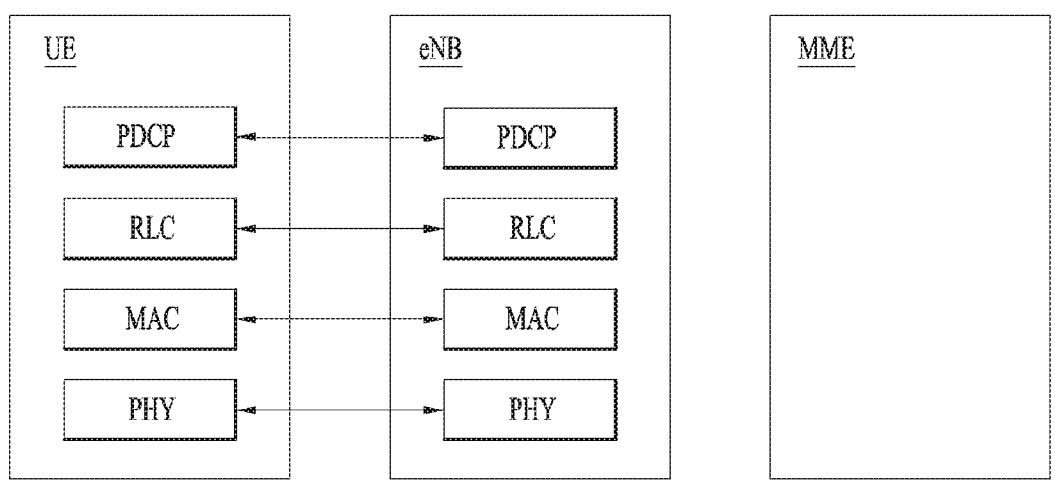
FIG. 4 is a diagram exemplarily illustrating the structure of a radio interface protocol in a user plane.

FIG. 3 is a diagram exemplarily illustrating the structure of a radio interface protocol in a control plane between a UE and an eNB, and FIG. 4 is a diagram exemplarily illustrating the structure of a radio interface protocol in a user plane between the UE and the eNB.

The radio interface protocol is based on the 3GPP wireless access network standard. The radio interface protocol horizontally includes a physical layer, a data link layer, and a networking layer. The radio interface protocol is divided into a user plane for transmission of data information and a control plane for delivering control signaling which are arranged vertically.

The protocol layers may be classified into a first layer (L1), a second layer (L2), and a third layer (L3) based on the three sublayers of the open system interconnection (OSI) model that is well known in the communication system.

Hereinafter, description will be given of a radio protocol in the control plane shown in FIG. 3 and a radio protocol in the user plane shown in FIG. 4.

The physical layer, which is the first layer, provides an information transfer service using a physical channel. The physical channel layer is connected to a medium access control (MAC) layer, which is a higher layer of the physical layer, through a transport channel. Data is transferred between the physical layer and the MAC layer through the transport channel. Transfer of data between different physical layers, i.e., a physical layer of a transmitter and a physical layer of a receiver is performed through the physical channel.

The physical channel consists of a plurality of subframes in the time domain and a plurality of subcarriers in the frequency domain. One subframe consists of a plurality of symbols in the time domain and a plurality of subcarriers. One subframe consists of a plurality of resource blocks. One resource block consists of a plurality of symbols and a plurality of subcarriers. A Transmission Time Interval (TTI), a unit time for data transmission, is 1 ms, which corresponds to one subframe.

According to 3GPP LTE, the physical channels present in the physical layers of the transmitter and the receiver may be divided into data channels corresponding to Physical Downlink Shared Channel (PDSCH) and Physical Uplink Shared Channel (PUSCH) and control channels corresponding to Physical Downlink Control Channel (PDCCH), Physical Control Format Indicator Channel (PCFICH), Physical Hybrid-ARQ Indicator Channel (PHICH) and Physical Uplink Control Channel (PUCCH).

The second layer includes various layers. First, the MAC layer in the second layer serves to map various logical channels to various transport channels and also serves to map various logical channels to one transport channel. The MAC layer is connected with an RLC layer, which is a higher layer, through a logical channel. The logical channel is broadly divided into a control channel for transmission of information of the control plane and a traffic channel for transmission of information of the user plane according to the types of transmitted information.

The radio link control (RLC) layer in the second layer serves to segment and concatenate data received from a higher layer to adjust the size of data such that the size is suitable for a lower layer to transmit the data in a radio interval.

The Packet Data Convergence Protocol (PDCP) layer in the second layer performs a header compression function of reducing the size of an IP packet header which has a relatively large size and contains unnecessary control information, in order to efficiently transmit an IP packet such as an IPv4 or IPv6 packet in a radio interval having a narrow bandwidth. In addition, in LTE, the PDCP layer also performs a security function, which consists of ciphering for preventing a third party from monitoring data and integrity protection for preventing data manipulation by a third party.

The Radio Resource Control (RRC) layer, which is located at the uppermost part of the third layer, is defined only in the control plane, and serves to configure radio bearers (RBs) and control a logical channel, a transport channel, and a physical channel in relation to reconfiguration and release operations. The RB represents a service provided by the second layer to ensure data transfer between a UE and the E-UTRAN.

The RBs are broadly divided into (user) data radio bearers (DRBs) and signaling radio bearers (SRBs). The SRBs are defined as RBs used only to transmit RRC and NAS messages. Particularly, the following three SRBs are currently defined:

SRB0 for RRC messages using a common control channel (CCCH) logical channel;

SRB1 for RRC messages (which may include piggybacked NAS messages) as well as for NAS messages prior to establishment of SRB2, using a dedicated control channel (DCCH) logical channel;

SRB2 for RRC messages which include logged measurement information as well as NAS messages, using the DCCH logical channel SRB2 has a lower priority than SRB1 and is always configured by an E-UTRAN after security activation.

Once security is activated, all RRC messages on SRB1 and SRB2, including NAS or non-3GPP messages are integrity-protected by a PDCP and are ciphered. The NAS independently applies integrity protection and ciphering to NAS messages.

If an RRC connection is established between the RRC layer of the UE and the RRC layer of a wireless network, the UE is in the RRC Connected mode. Otherwise, the UE is in the RRC Idle mode.

Hereinafter, description will be given of the RRC state of the UE and an RRC connection method. The RRC state refers to a state in which the RRC of the UE is or is not logically connected with the RRC of the E-UTRAN. The RRC state of the UE having logical connection with the RRC of the E-UTRAN is referred to as an RRC_CONNECTED state. The RRC state of the UE which does not have logical connection with the RRC of the E-UTRAN is referred to as an RRC_IDLE state. A UE in the RRC_CONNECTED state has RRC connection, and thus the E-UTRAN may recognize presence of the UE in a cell unit. Accordingly, the UE may be efficiently controlled. On the other hand, the E-UTRAN cannot recognize presence of a UE which is in the RRC_IDLE state. The UE in the RRC_IDLE state is managed by a core network in a tracking area (TA) which is an area unit larger than the cell. That is, for the UE in the RRC_IDLE state, only presence or absence of the UE is recognized in an area unit larger than the cell. In order for the UE in the RRC_IDLE state to be provided with a usual mobile communication service such as a voice service and a data service, the UE should transition to the RRC_CONNECTED state. A TA is distinguished from another TA by a tracking area identity (TAI) thereof. A UE may configure the TAI through a tracking area code (TAC), which is information broadcast from a cell.

When the user initially turns on the UE, the UE searches for a proper cell first. Then, the UE establishes RRC connection in the cell and registers information thereabout in the core network. Thereafter, the UE stays in the RRC_IDLE state. When necessary, the UE staying in the RRC_IDLE state selects a cell (again) and checks system information or paging information. This operation is called camping on a cell. Only when the UE staying in the RRC_IDLE state needs to establish RRC connection, does the UE establish RRC connection with the RRC layer of the E-UTRAN through the RRC connection procedure and transition to the RRC_CONNECTED state. The UE staying in the RRC_IDLE state needs to establish RRC connection in many cases. For example, the cases may include an attempt of a user to make a phone call, an attempt to transmit data, or transmission of a response message after reception of a paging message from the E-UTRAN.

The non-access stratum (NAS) layer positioned over the RRC layer performs functions such as session management and mobility management.

Hereinafter, the NAS layer shown in FIG. 3 will be described in detail.

The ESM (Evolved Session Management) belonging to the NAS layer performs functions such as default bearer management and dedicated bearer management to control a UE to use a PS service from a network. The UE is assigned a default bearer resource by a specific packet data network (PDN) when the UE initially accesses the PDN. In this case, the network allocates an available IP to the UE to allow the UE to use a data service. The network also allocates QoS of a default bearer to the UE. LTE supports two kinds of bearers. One bearer is a bearer having characteristics of guaranteed bit rate (GBR) QoS for guaranteeing a specific bandwidth for transmission and reception of data, and the other bearer is a non-GBR bearer which has characteristics of best effort QoS without guaranteeing a bandwidth. The default bearer is assigned to a non-GBR bearer. The dedicated bearer may be assigned a bearer having QoS characteristics of GBR or non-GBR.

A bearer allocated to the UE by the network is referred to as an evolved packet service (EPS) bearer. When the EPS bearer is allocated to the UE, the network assigns one ID. This ID is called an EPS bearer ID. One EPS bearer has QoS characteristics of a maximum bit rate (MBR) and/or a guaranteed bit rate (GBR).

FIG. 5 illustrates LTE protocol stacks for a user plane and a control plane. FIG. 5(a) illustrates user plane protocol stacks over UE-eNB-SGW-PGW-PDN and FIG. 5(b) illustrates control plane protocol stacks over UE-eNB-MME-SGW-PGW. Functions of key layers of the protocol stacks will now be briefly described below.

Referring to FIG. 5(a), a GTP-U protocol is used to forward user IP packets over an S1-U/S5/X2 interface. If a GTP tunnel is established to forward data during LTE handover, an end marker packet is transferred to the GTP tunnel as the last packet.

Referring to FIG. 5(b), an S1-AP protocol is applied to an S1-MME interface. The S1-AP protocol supports functions such as S1 interface management, E-RAB management, NAS signaling delivery, and UE context management. The S1-AP protocol transfers an initial UE context to the eNB in order to set up E-RAB(s) and then manages modification or release of the UE context. A GTP-C protocol is applied to S11/S5 interfaces. The GTP-C protocol supports exchange of control information for generation, modification, and termination of GTP tunnel(s). The GTP-C protocol generates data forwarding tunnels in the case of LTE handover.

A description of the protocol stacks and interfaces illustrated in FIGS. 3 and 4 is applicable to the same protocol stacks and interfaces illustrated in FIG. 5.

Figure 6:
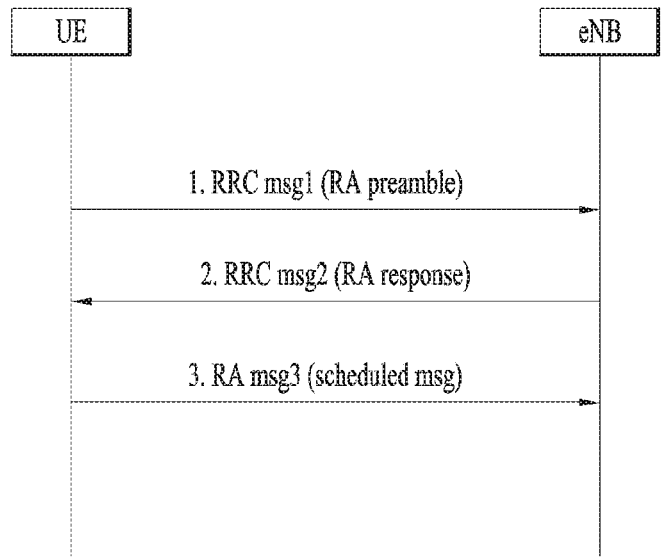
FIG. 6 is a flow diagram illustrating a random access procedure.

FIG. 6 is a flowchart illustrating a random access procedure in 3GPP LTE.

The random access procedure is used for a UE to obtain UL synchronization with a base station or to be assigned a UL radio resource.

The UE receives a root index and a physical random access channel (PRACH) configuration index from an eNB. Each cell has 64 candidate random access preambles defined by a Zadoff-Chu (ZC) sequence. The root index is a logical index used for the UE to generate 64 candidate random access preambles.

Transmission of a random access preamble is limited to a specific time and frequency resources for each cell. The PRACH configuration index indicates a specific subframe and preamble format in which transmission of the random access preamble is possible.

The random access procedure, in particular, a contention-based random access procedure, includes the following three steps. Messages transmitted in the following steps 1, 2, and 3 are referred to as msg1, msg2, and msg4, respectively.

1. The UE transmits a randomly selected random access preamble to the eNodeB. The UE selects a random access preamble from among 64 candidate random access preambles and the UE selects a subframe corresponding to the PRACH configuration index. The UE transmits the selected random access preamble in the selected subframe.
2. Upon receiving the random access preamble, the eNB sends a random access response (RAR) to the UE. The RAR is detected in two steps. First, the UE detects a PDCCH masked with a random access (RA)-RNTI. The UE receives an RAR in a MAC (medium access control) PDU (protocol data unit) on a PDSCH indicated by the detected PDCCH. The RAR includes timing advance (TA) information indicating timing offset information for UL synchronization, UL resource allocation information (UL grant information), and a temporary UE identifier (e.g., a temporary cell-RNTI (TC-RNTI)).
3. The UE may perform UL transmission according to resource allocation information (i.e., scheduling information) and a TA value in the RAR. HARQ is applied to UL transmission corresponding to the RAR. Accordingly, after performing UL transmission, the UE may receive reception response information (e.g., a PHICH) corresponding to UL transmission.

Figure 7:
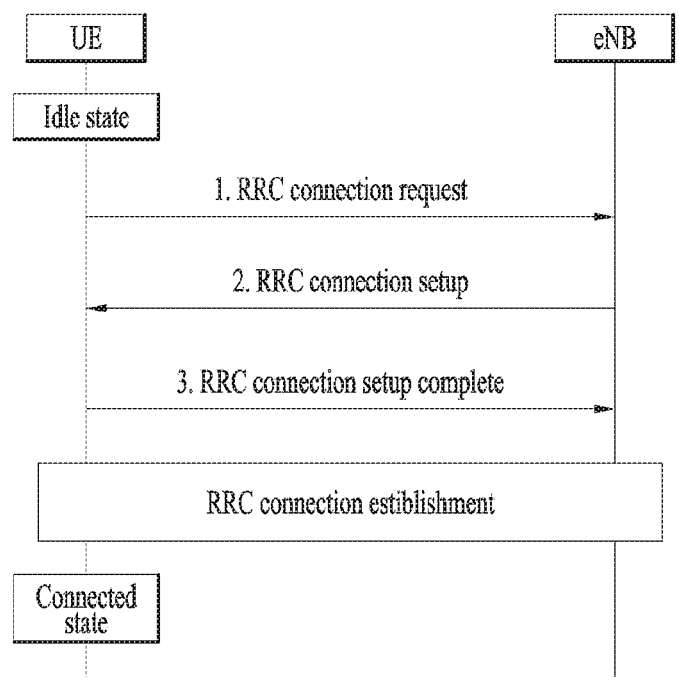
FIG. 7 is a diagram illustrating a connection procedure in a radio resource control (RRC) layer.

FIG. 7 illustrates a connection procedure in a radio resource control (RRC) layer.

As shown in FIG. 7, the RRC state is set according to whether or not RRC connection is established. An RRC state indicates whether or not an entity of the RRC layer of a UE has logical connection with an entity of the RRC layer of an eNB. An RRC state in which the entity of the RRC layer of the UE is logically connected with the entity of the RRC layer of the eNB is called an RRC connected state. An RRC state in which the entity of the RRC layer of the UE is not logically connected with the entity of the RRC layer of the eNB is called an RRC idle stat.

A UE in the connected state has RRC connection, and thus the E-UTRAN may recognize presence of the UE in a cell unit. Accordingly, the UE may be efficiently controlled. On the other hand, the eNB cannot recognize presence of a UE which is in the idle state. The UE in the idle state is managed by the core network in a tracking area unit which is an area unit larger than the cell. The tracking area is a unit of a set of cells. That is, for the UE which is in the idle state, only presence or absence of the UE is recognized in a larger area unit. In order for the UE in the idle state to be provided with a usual mobile communication service such as a voice service and a data service, the UE should transition to the connected state.

When the user initially turns on the UE, the UE searches for a proper cell first, and then stays in the idle state. Only when the UE staying in the idle state needs to establish RRC connection, does the UE establish RRC connection with the RRC layer of the eNB through the RRC connection procedure and then transition to the RRC connected state.

The UE staying in the idle state needs to establish RRC connection in many cases. For example, the cases may include an attempt of a user to make a phone call, an attempt to transmit data, or transmission of a response message after reception of a paging message from the E-UTRAN.

In order for the UE in the idle state to establish RRC connection with the eNodeB, the RRC connection procedure needs to be performed as described above. The RRC connection procedure is broadly divided into transmission of an RRC connection request message from the UE to the eNB, transmission of an RRC connection setup message from the eNB to the UE, and transmission of an RRC connection setup complete message from the UE to eNB, which are described in detail below with reference to FIG. 7.

1. When the UE in the idle state desires to establish RRC connection for reasons such as an attempt to make a call, a data transmission attempt, or a response of the eNB to paging, the UE transmits an RRC connection request message to the eNB first.
2. Upon receiving the RRC connection request message from the UE, the eNB accepts the RRC connection request of the UE when the radio resources are sufficient, and then transmits an RRC connection setup message, which is a response message, to the UE.
3. Upon receiving the RRC connection setup message, the UE transmits an RRC connection setup complete message to the eNB.

Only when the UE successfully transmits the RRC connection setup complete message, does the UE establish RRC connection with the eNB and transition to the RRC connected mode.

In order for the UE of an idle state to transition to an activation state in which traffic transmission/reception can be performed due to occurrence of new traffic, a service request procedure is performed. If traffic to be transmitted by the UE occurs or traffic to be transmitted to the UE by a network occurs in a state in which the UE is registered with the network but an S1 connection is released and a wireless resource is not allocated to the UE due to traffic inactivation, i.e., in a state in which the UE is in an EMM registered state (EMM-Registered) but is in an ECM-Idle state, the UE requests that the network provide a service. Upon successfully completing the service request process, the UE transitions to an ECM connected state (ECM-Connected) and configures an ECM connection (RRC connection+S1 signaling connection) in a control plane and an E-RAB (a data radio bearer (DRB) and an S1 bearer) in a user plane, thereby transmitting/receiving traffic. If the network desires to transfer traffic to the UE of an ECM idle state (ECM-Idle), the network informs the UE, through a paging message, that there is traffic to be transmitted so that the UE may request that the network provide a service.

Hereinafter, a network triggered service request procedure will be described in brief. If an MME has or needs to transmit downlink data or signals to an UE in the ECM-IDLE state, for example, if the MME needs to perform the MME/HSS-initiated detach procedure for the ECM-IDLE mode UE or an S-GW receives control signaling (e.g. Create Bearer Request or Modify Bearer Request), the MME starts the network triggered service request procedure. When the S-GW receives Create Bearer Request or Modify Bearer Request for a UE in the state that ISR is activated, the S-GW does not have a downlink S1-U, and an SGSN has notified the S-GW that the UE has moved to an PMM-IDLE or STANDBY state, the S-GW buffers signaling messages and transmits Downlink Data Notification to trigger the MME and SGSN to page the UE. If the S-GW is triggered to send second Downlink Data Notification for a bearer with higher priority (i.e. ARP priority level) than that for which the first Downlink Data Notification was sent while waiting for the user plane to be established, the S-GW sends a new Downlink Data Notification message indicating the higher priority to the MME. If the S-GW receives additional downlink data packets for a bearer with same or higher priority than that for which the first Downlink Data Notification was sent, or if after sensing a second Downlink Data Notification message indicating the higher priority, the S-GW receives additional downlink data packets for the UE, the S-GW buffers these downlink data packets and does not send new Downlink Data Notification. The S-GW will be notified about the current RAT type based on a UE triggered service request procedure. In addition, the S-GW will keep executing a dedicated bearer activation or dedicated bearer modification procedure. That is, the S-GW will send corresponding buffered signaling to the MME or SGSN where UE resides in now and inform a P-GW of the current RAT type if the RAT type has been changed compared to the last reported RAT Type. If dynamic PCC is deployed, the current RAT type information can be conveyed from the P-GW to a PCRF. If PCRF response leads to EPS bearer modification, the P-GW initiates a bearer update procedure. When sending the Downlink Data Notification, the S-GW includes both an EPS bearer ID and ARP. If the Downlink Data Notification is triggered by the arrival of downlink data packets at the S-GW, the S-GW includes an EPS bearer ID and ARP associated with the bearer through which the downlink data packet was received. If the Downlink Data Notification is triggered by the arrival of control signaling and if the control signaling includes an EPS bearer ID and ARP, the S-GW includes the corresponding EPS bearer ID and APR. If the ARP is not present in the control signaling, the S-GW includes an ARP in a stored EPS bearer context. When an L-GW receives downlink data for a UE in the ECM-IDLE state, if a LIPA PDN connection exists, the L-GW sends the first downlink user packet to the S-GW and buffers all other downlink user packets. The S-GW triggers the MME to page the UE. Details of the network triggered service request procedure can be found in section 5.3.4.3 of 3GPP TS 23.401.

Figure 8:
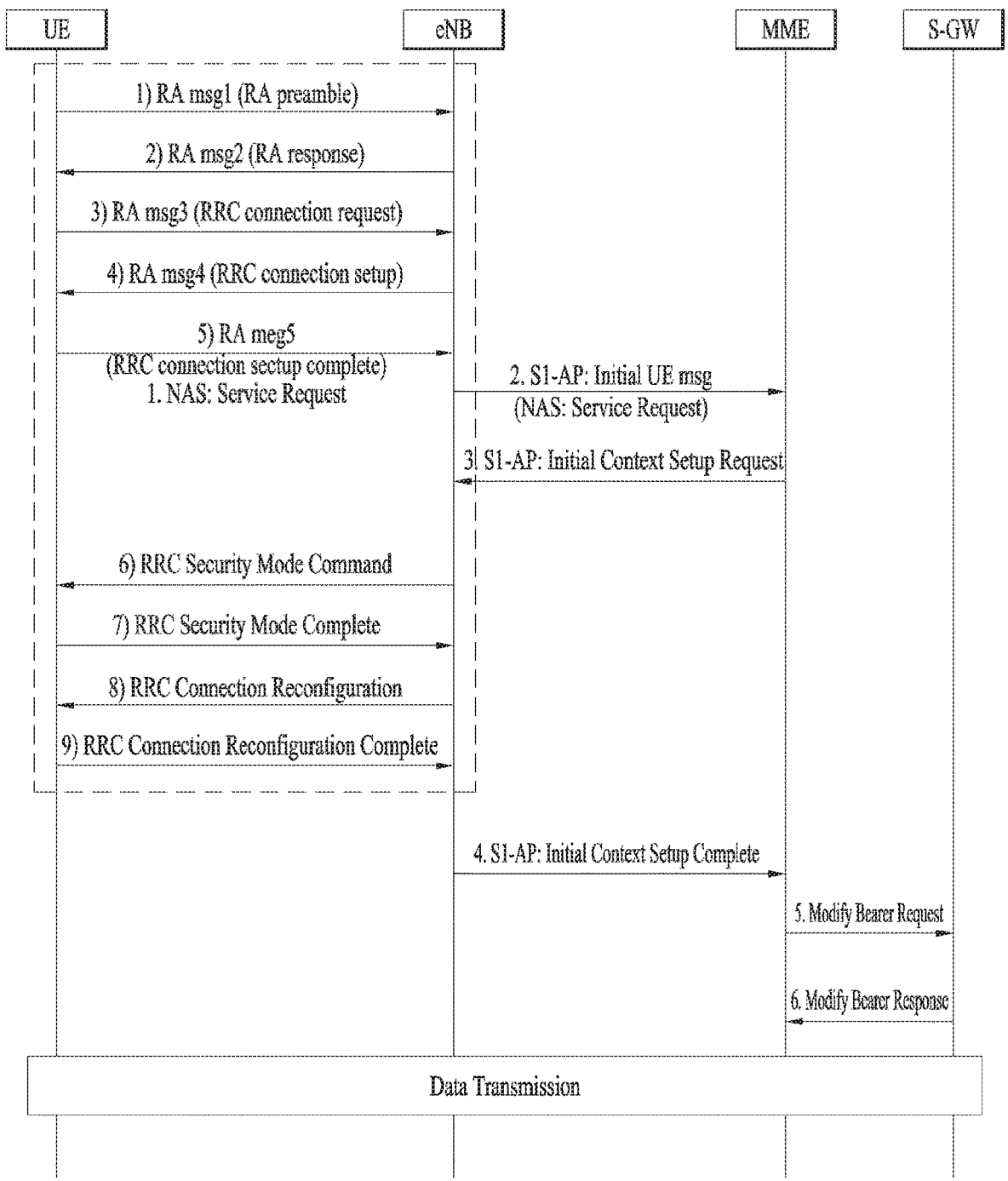
FIG. 8 illustrates a UE triggered Service Request procedure.

FIG. 8 illustrates a UE triggered service request procedure.

Referring to FIG. 8, when a UE has traffic to be transmitted, the UE sends to an eNB an RRC connection request through a random access procedure, that is, by performing steps 1) to 3). When the eNB accepts the RRC connection request from the UE, the eNB sends an RRC Connection Setup message to the UE. Upon receiving the RRC Connection Setup message, the UE sends an RRC Connection Setup Complete message to the eNB by including a service request in the message. This will be described in detail with respect to a service request between a UE and MME.

1. The UE sends NAS message Service Request towards the MME encapsulated in an RRC message (e.g. RA msg5 of FIG. 8) to the eNB.

2. The eNB forwards NAS message to MME. NAS message is encapsulated in an S1-AP.

3. The MME sends an S1-AP Initial Context Setup Request message to the eNB. In this step, radio and S1 bearers are activated for all activate EPS bearers. The eNB stores a security context, MME signaling connection ID, EPS bearer QoS(s), etc. in a UE context.

The eNB performs a radio bearer establishment procedure. The radio bearer establishment procedure includes steps 6) to 9) illustrated in FIG. 8.

4. The eNB sends S1-AP message Initial Context Setup Request to the MME.

5. The MME sends a Modify Bearer Request message for each PDN connection to an S-GW.

6. The S-GW returns Modify Bearer Response to the MME in response to the Modify Bearer Request message.

Thereafter, traffic is transmitted/received via the E-RAB established through the service request procedure.

Hereinafter, a buffer status report (BSR) procedure used by the network to dynamically allocate a radio resource to the UE will be described.

Figure 9:
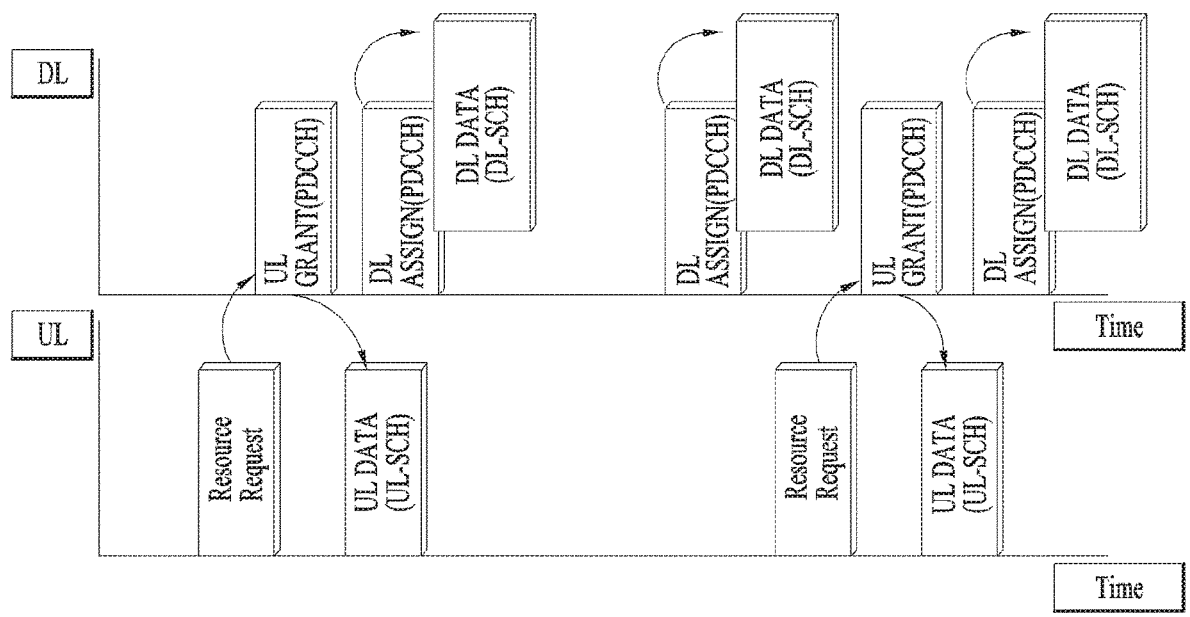
FIG. 9 illustrates a dynamic radio resource allocation procedure.

FIG. 9 illustrates a dynamic radio resource allocation procedure.

To efficiently use a radio resource in an LTE system, the eNB needs to be aware of how much data and which data each UE desires to transmit. Downlink (DL) data is transmitted to the eNB from an access gateway. Therefore, the eNB is aware of how much data should be transmitted to each UE on DL. Referring to FIG. 9, the eNB may provide a DL grant to the UE through a physical downlink control channel (PDCCH) and the UE may receive DL data on a DL resource allocated by the DL grant.

As opposed to DL data, in the case of uplink (UL) data, the eNB is unaware of how many UL radio resources each UE requires unless the UE directly informs the eNB of information about data that the UE desires to transmit on UL. Therefore, in order to enable the eNB to properly allocate a UL radio resource to the UE, each UE provides the eNB with information necessary for the eNB to schedule the radio resource. For example, when there is data that the UE is to transmit, the UE informs the eNB of presence of data to be transmitted. Then, the eNB transmits a resource allocation message to the UE based on the information provided by the UE. Referring to FIG. 9, if the UE makes a request for resources on UL, the eNB transmits a UL grant to the UE through the PDCCH and the UE transmits UL data using a UL radio resource allocated according to the UL grant.

When the UE informs the eNB that there is data that the UE is to transmit, the UE informs the eNB of the amount of data stored in a buffer thereof. This is referred to as a buffer status report (BSR).

When the BSR is generated, if the UL radio resource allocated to the UE is present, the UE immediately transmits the BSR using the UL radio resource. In the LTE system, the BSR is generated in the form of a MAC control element and is transmitted in a MAC PDU to the eNB by the UE. That is, the UL radio resource is needed even to transmit the BSR. Accordingly, in some cases, the UE needs to transmit a request for UL radio resource allocation for BSR transmission to the eNB. A procedure through which the UE transmits the BSR to the eNB is referred to as a BSR procedure.

As described above, when data is present in the buffer of the UE, if a predetermined condition is satisfied, the UE should transmit the BSR to the eNB. However, the BSR has no direct relation to user data which is data that the UE and the eNB desire to actually transmit and receive. That is, the BSR is transmitted to the eNB for the purpose of transmitting information needed by the eNB to effectively allocate a radio resource to the UE and is not transmitted for the purpose of transmitting actual user data. Therefore, reducing the size of the BSR to be as small as possible is helpful to reduce waste of radio resources used to transmit the BSR. That is, it is better for the BSR to be as simple as possible.

Meanwhile, multiple logical channels are present for the UE and each logical channel has a different priority. For example, in the case of an SRB used to transmit and receive an RRC message between the eNB and the UE, if there is (control) data that should be transmitted using an SRB, i.e., the RRC message or a NAS message, then the UE needs to inform the eNB of presence of such data as quickly as possible. Then, the eNB will preferentially allocate the radio resource to the UE when data is present on the SRB. On the other hand, if data is present on a logical channel for voice over Internet protocol (VoIP), if there are UEs other than the UE in a corresponding cell, if the UEs establish a channel having a higher priority than VoIP, and if data is present on the channel having a high priority, then the UE need not quickly transmit the BSR to the eNB and the eNB will not immediately allocate the radio resource to the UE. Therefore, a BSR which is as an accurate as possible is desirably demanded in consideration of difference in channels. In this case, since a more accurate BSR can include more detailed information, performance is improved in terms of a scheduler of the eNB.

Recently, machine type communication (MTC) has come to the fore as a significant communication standard issue. MTC refers to exchange of information between a machine and an eNB without involving persons or with minimal human intervention. For example, MTC may be used for data communication for measurement/sensing/reporting such as meter reading, water level measurement, use of a surveillance camera, inventory reporting of a vending machine, etc. and may also be used for automatic application or firmware update processes for a plurality of UEs. In MTC, the amount of transmission data is small and UL/DL data transmission or reception (hereinafter, transmission/reception) occurs occasionally. In consideration of such properties of MTC, it would be better in terms of efficiency to reduce production cost and battery consumption of UEs for MTC (hereinafter, MTC UEs) according to data transmission rate. Since the MTC UE has low mobility, the channel environment thereof remains substantially the same. If an MTC UE is used for metering, reading of a meter, surveillance, and the like, the MTC UE is very likely to be located in a place such as a basement, a warehouse, and mountain regions which the coverage of a typical eNB does not reach. In consideration of the purposes of the MTC UE, it is better for a signal for the MTC UE to have wider coverage than the signal for the conventional UE (hereinafter, a legacy UE).

It is expected that a number of devices will be wirelessly connected to each other through the Internet of Things (IoT). The IoT means internetworking of physical devices, connected devices, smart devices, buildings, and other items with electronics, software, sensors, actuators, and network connectivity that enable these objects to collect and exchange data. In other words, the IoT refers to a network of physical objects, machines, people, and other devices that enable connectivity and communication for the purpose of exchanging data for intelligent applications and services. The IoT allows objects to be sensed and controlled remotely through existing network infrastructures, thereby providing opportunities for the direct integration between the physical and digital worlds, which result in improving efficiency, accuracy and economic benefits. Particularly, in the present invention, the IoT using the 3GPP technology is referred to as cellular IoT (CIoT). In addition, the CIoT that transmits/receives IoT signals using a narrowband (e.g., a frequency band of about 200 kHz) is called NB-IoT.

The CIoT is used to monitor traffic transmitted over a relatively long period, e.g., from a few decades to a year (e.g., smoke alarm detection, power failure notification from smart meters, tamper notification, smart utility (gas/water/electricity) metering reports, software patches/updates, etc.) and support 'IoT' devices characterized as ultra-low complexity, power limitation and low data rates.

In the prior art, an EMM-Idle mode UE should establish a connection with the network to transmit data. To this end, the UE should successfully complete the service request procedure illustrated in FIG. 9, but it is not suitable for the CIoT that requires optimized power consumption for the low data rate. To transmit data to an application, two types of optimization: User Plane CIoT EPS optimization and Control Plane CIoT EPS optimization has been defined for the CIoT in the EPS.

The User Plane CIoT EPS optimization and Control Plane CIoT optimization can be referred to U-plane CIoT EPS optimization and C-plane CIoT EPS optimization, respectively.

Figure 10:
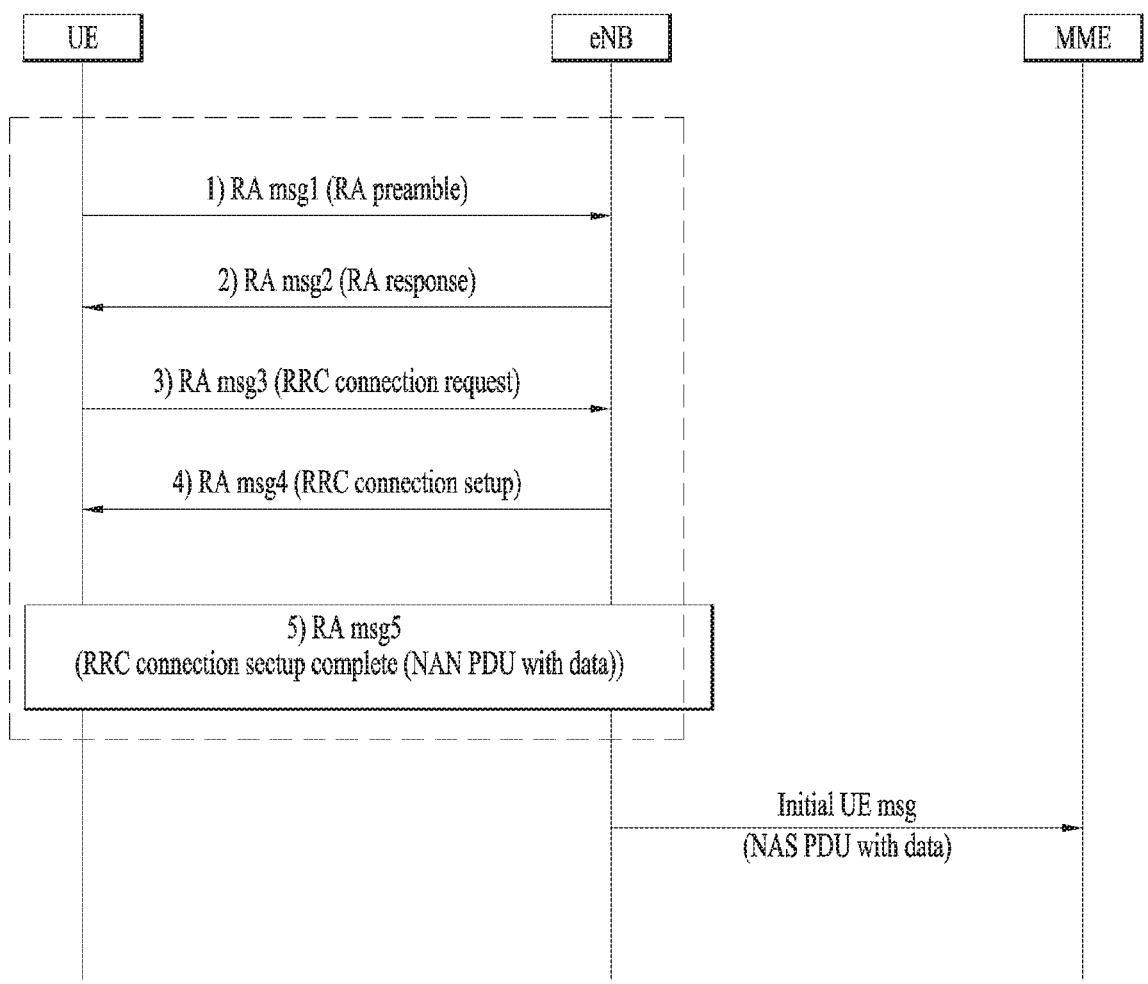
FIG. 10 illustrates in brief a data transfer procedure in accordance with Control Plane CIoT EPS optimization regarding radio signals.

FIG. 10 illustrates in brief a data transfer procedure in accordance with Control Plane CIoT EPS optimization regarding radio signals.

In the Control Plane CIoT EPS optimization, uplink (UL) data is transferred from an eNB (CIoT RAN) to an MME. Thereafter, the UL data may be transmitted from the MME to a P-GW through an S-GW. Through these nodes, the UL data is forwarded to an application server (i.e., CIoT services). DL data is transmitted through the same path in the opposite direction. In the case of a Control Plane CIoT EPS optimization solution, there is no setup data radio bearer, but data packets are transmitted through signaling radio bearers. Thus, this solution is most suitable for transmission of infrequent small data packets.

When a UE and MME use the Control Plane CIoT EPS optimization, the UE and MME may transfer IP or non-IP data through NAS signaling depending on data types selected for a PDN connection supported at PDN connection establishment.

The Control Plane CIoT EPS optimization can be achieved by using NAS transport capabilities of RRC and S1-AP protocols and data transfer through GTP (Evolved General Packet Radio Service (GPRS) Tunneling Protocol) tunnels between an MME and an S-GW and between an S-GW and a P-GW.

Figure 11:
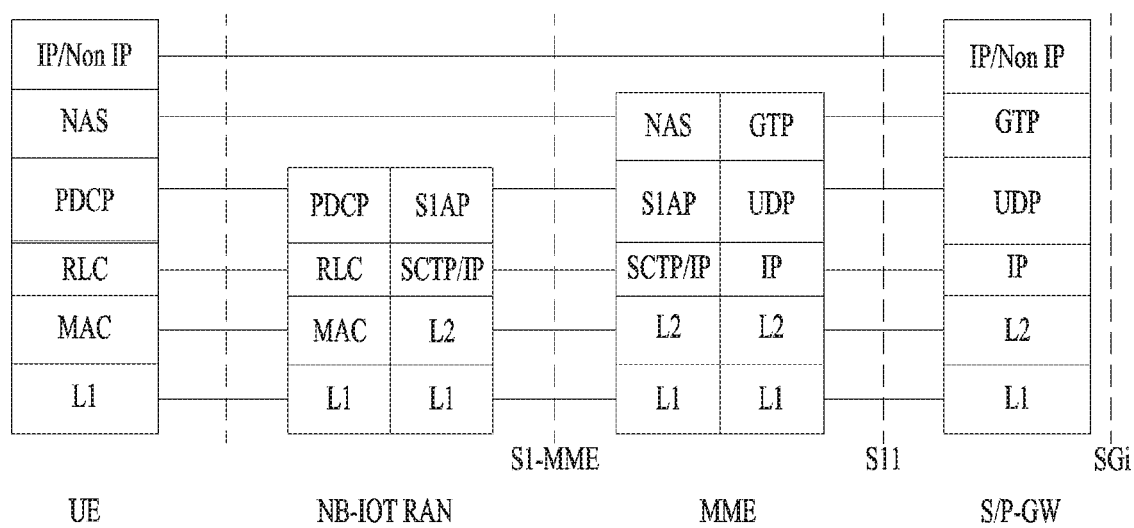
FIG. 11 illustrates user plane protocol stacks between a UE and a P-GW in accordance with the Control Plane CIoT EPS optimization.

FIG. 11 illustrates mobile terminated data transfer in the Control Plane CIoT EPS optimization.

In FIG. 11, GTP-u is a protocol which tunnels user data between MME and the S GW as well as between the S GW and the P GW in the backbone network. GTP encapsulates all end user packets. UDP/IP are the backbone network protocols used for routing user data and control signalling. NAS is the Non Access Stratum Layer used to carry Data between UE and MME and may include Header compression and security functions of user plane IP data.

Hereinafter, a CIoT network or technology refers to providing an optimized communication service to an IoT UE mainly in terms of a core network and a narrowband Internet of things (NB-IoT) network or technology refers to optimizing a radio interface of legacy LTE technology for IoT.

As known by the name of NB-IoT, NB-IoT is radio technology for providing an IoT service using a narrowband frequency of about 200 kHz. As compared with legacy LTE technology using a frequency band of a minimum of 1.25 MHz, NB-IoT uses a significantly narrow frequency band. Therefore, processing power can be minimized and power consumption can be minimized in terms of the UE.

CIoT is technology for minimizing power consumption of the UE through a scheme in which an MME processes data (C-plane solution) or a scheme in which the UE and the eNB maintain a context and use the context for the next connection (U-plane solution) even when the UE is in a state similar to an RRC_IDLE state, in order to solve waste of power of the UE caused by exchange of numerous messages in a legacy attach procedure or service request procedure (refer to FIG. 8).

Therefore, NB-IoT radio technology and CIoT technology are individually applicable. That is, even when the NB-IoT radio technology is not used, it is possible to apply the CIoT technology through a legacy LTE radio network. This means that the CIoT technology is applicable to a UE incapable of using the NB-IoT radio technology, for example, a UE which has already been released by applying only the LTE radio technology. This also means that a cell based on the legacy LTE radio technology may support a legacy LTE UE such as a smartphone and simultaneously support an IoT UE.

According to a CIoT operation discussed up to now, the UE and the eNB exchange RRC control information, NAS control information, and user data, using SRB1. Before CIoT is introduced, since a NAS message is a control message and an RRC message is also the control message, it is unnecessary to distinguish priority between the NAS and RRC messages which are defined to be transmitted through the same SRB. Conventionally, if the UE transmits an initial NAS message (e.g., a service request message or a TA update request message) as an RRC connection setup complete message, a new NAS message is not generated until a response to the RRC connection setup complete message is received. However, the UE supporting the CIoT technology may continue to generate the NAS message in order to transmit user data even after transmitting the initial NAS message. In the case of a C-plane solution, the user data is included in the NAS message and the RRC message and then is transferred to a lower layer. According to scheduling determination of a network, the RRC message may not be immediately transmitted to the network and may wait for resource allocation from the network for a long time while being stored in the lower layer. In this case, the UE and the eNB may have difficulty in rapidly exchanging RRC or NAS control information. For example, when only SRB1 is configured between the eNB and the UE and an application of the UE generates packets 1, 2, 3, 4, and 5, NAS messages are first generated from these packets in a NAS layer. Then, the NAS messages are included in RRC messages in an RRC layer and transferred to the lower layer. After this, if the network does not allocate a radio resource for the packets, the packets continue to be stored in the UE. In this situation, let's assume that the eNB transmits an RRC reconfiguration message to the UE. Then, the UE will generate a response message to the RRC reconfiguration message, i.e., an RRC reconfiguration complete message, and transmit the RRC reconfiguration complete message to the eNB. Since the RRC reconfiguration complete message should be transmitted on SRB1, the RRC reconfiguration complete message may be transmitted to the eNB only after the packets 1, 2, 3, 4, and 5 using the same SRB are transmitted. Consequently, an important control message may not be immediately transmitted to the eNB due to the previously generated user data.

Figure 12:
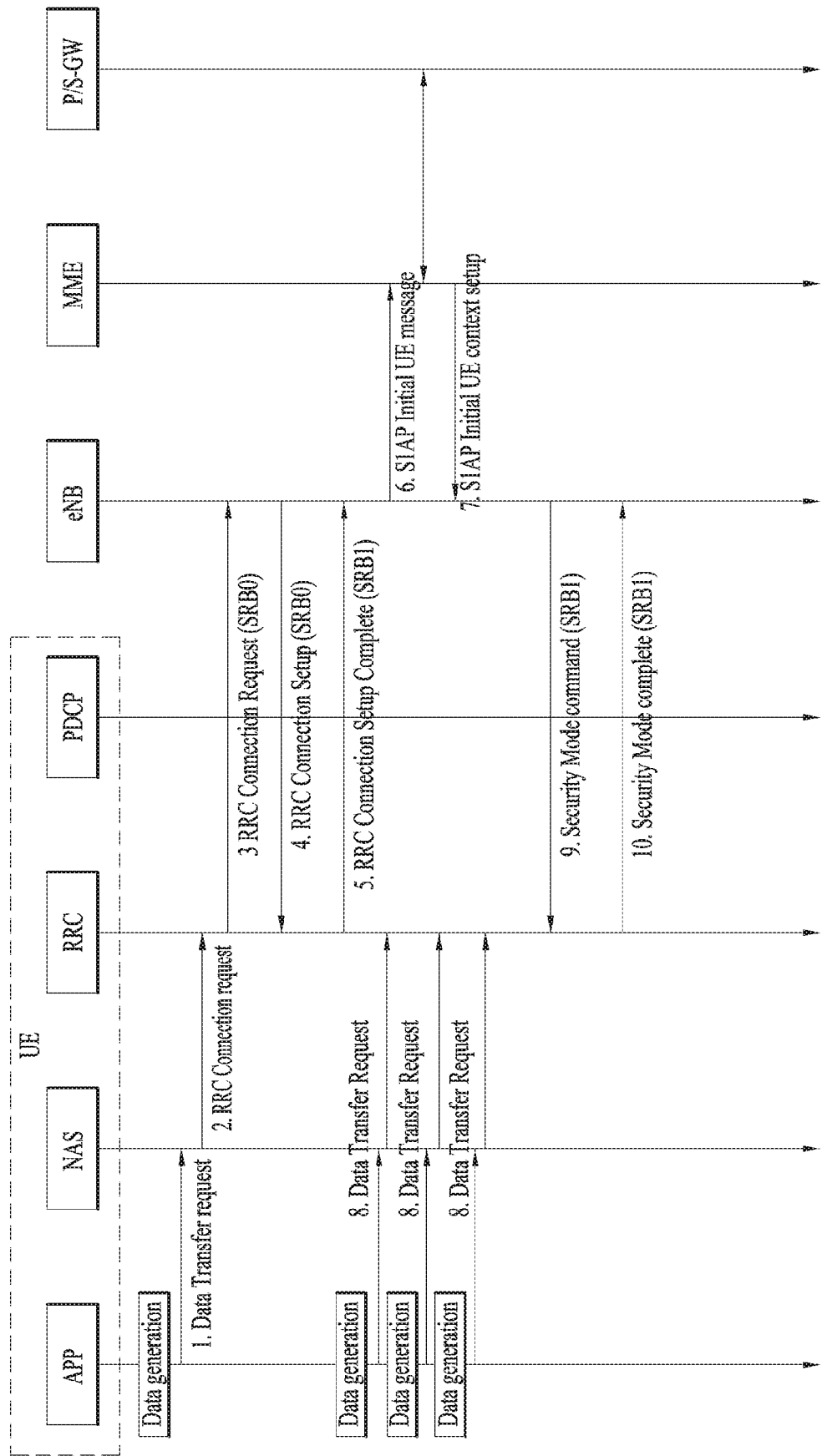
FIG. 12 illustrates a user data transfer procedure according to control plane CIoT optimization.

FIG. 12 illustrates a user data transfer procedure according to control plane CIoT optimization. Particularly, in FIG. 12, user data is transmitted through SRB1.

0. Data is generated by an application (APP).
1. The APP transfers the generated data to a NAS layer.
2. The NAS layer starts to perform a procedure such as a service request in order to transfer the generated data to a network.
3. An RRC layer of the UE transmits an RRC connection request message through SRB0 in order to establish RRC connection with the eNB.
4. The eNB transmits an RRC connection setup message through SRB0 as a response to the RRC connection request message. The RRC connection setup message contains information for setting up SRB1.
5. The UE processes the received RRC connection setup message, configures an RRC connection setup complete message as a response to the RRC connection setup message, and transmits the RRC connection setup complete message through SRB1. Herein, the RRC connection setup complete message may contain higher layer information (e.g., a service request message and a TA update request message).
6. Upon receiving the RRC connection setup complete message in step 5, the eNB transmits a NAS message contained in the RRC connection setup complete message to an MME as an S1-AP message (e.g., an initial UE message).
7. The MME configures a context for a user of the UE based on the NAS message received in step 6, contains a response to the NAS message in an S1-AP message (e.g., an initial UE context setup message), and transmits the S1-AP message to the eNB. Herein, the MME also transmits security context information about the user to the eNB.
8. In the middle of steps 5 to 7, the APP of the UE may generate additional data. Since SRB0 may be used only to transmit the RRC connection request message and the RRC connection setup message, the data generated in steps 5 to 7 is transmitted through SRB1. Therefore, the data generated in steps 5 to 7 is stacked in a buffer of the lower layer (e.g., RLC) through SRB1.
9. The eNB transmits a security mode command message to the UE based on the security context information received in step 7 in order to apply security, i.e., ciphering and integrity protection, to a radio link with the UE.
10. The UE configures a security mode complete message as a response to the security mode command message and attempts to transmit the security mode complete message to the eNB through SRB1.

In FIG. 12, a message such as the security mode command message of step 9 has a high degree of importance and, only when step 10 is successfully performed, a DRB, which is a user plane bearer, may be smoothly configured. The security mode complete message of step 10 is transmitted through SRB1 and the data has already been stored in the buffer for SRB1 in step 8. Therefore, the security mode complete message cannot be transmitted to the eNB until all of the data stored in the buffer for SRB1 in advance of the security mode complete message is transmitted to the eNB. This causes delay of transmission of a control message used in the RRC layer, thereby resulting in increase in the danger of breaking RRC connection.

Meanwhile, if the UE determines to transmit the NAS message through SRB2 rather than SRB1 in order to solve the problem occurring when the RRC/NAS messages use the same SRB, there is a problem in that, in the current standards technologies, the UE should wait until SRB2 is generated for transmission of the NAS message.

Accordingly, the present invention is devised to propose a method of guaranteeing that RRC control information and NAS control information are preferentially transmitted even when user data is transmitted through an SRB by using a NAS message and an RRC message.

Meanwhile, in terms of the eNB, since the amount of radio resources capable of being used in one cell is limited, it is important to provide a proper amount of radio resources to each UE at the most proper timing. Accordingly, the BSR procedure described with respect to FIG. 9 is used and each UE should transmit a buffer status thereof as accurately as possible in the BSR procedure. In a conventional BSR procedure, the UE informs the eNB of the amount of a buffer with respect to each logical channel group (LCG). A legacy eNB has allocated a logical channel through which an RRC message is transmitted and a logical channel through which user data is transmitted to different LCGs. Therefore, according to the conventional BSR procedure, the eNB has separately identified the amount of RRC messages and the amount of user data. However, when the CIoT technology is applied, for example, when the user data is transmitted through the RRC message, the eNB cannot accurately identify a buffer status of each UE. That is, since the user data is transmitted through the RRC message in the CIoT technology, the eNB may misjudge the amount of RRC messages to be large and then allocates radio resources for the purpose of causing the UE to transmit the RRC message. However, in actuality, the UE may use the radio resources for transmission of the user data. There is no problem when only one UE that uses the CIoT technology is present in one cell. However, since a cellular system is characterized in that multiple UEs are present in one cell, if radio resources are incorrectly allocated to any UE or are incorrectly used, radio resources may not be correctly allocated to the other UEs. This is a cause of user dissatisfaction with services and a phenomenon of frequent disconnection.

In this way, conventionally, since all of an RRC message, a NAS message including data, and a simple NAS message are transmitted through SRB1 prior to security activation, there was no way for a MAC layer performing a BSR to distinguish between these messages.

Therefore, the present invention proposes technology in which a UE applying the CIoT technology accurately informs the network of a buffer status thereof and, at the same time, the network accurately identifies the buffer status of each UE.

Hereinafter, although the present invention will be described using CIoT, proposals of the present invention may equally be applied to NB-IoT.

<Proposal A>

The present invention proposes that the UE and eNB generate a plurality of SRBs and transmit messages or data using different SRBs according to properties of the messages or data. According to the present invention, even when user data is transmitted using a NAS message and an RRC message through an SRB, RRC control information and NAS control information may be preferentially transmitted.

For CIoT, the UE and the network generate and use a new SRB in addition to SRB1. SRB2 may be used only when security has been configured between the UE and the eNB. In contrast, the new SRB is capable of being used even without security configuration between the eNB and the UE. This is because security need not be activated in a C-plane solution since a PDCP cannot read the NAS message. Hereinafter, for convenience of description, the new SRB will be referred to as SRB3. However, it is apparent that other names may be used for the new SRB only if the new SRB can be distinguished from legacy SRBs (e.g., SRB0, SRB1, and SRB2). SRB3 is an SRB between the UE and the eNB. Accordingly, SRB3 may be used to deliver the RRC message and the NAS message and may be used even when a security context is not configured. The UE in an RRC Idle mode transmits an RRC connection request message through SRB0 and then transmits the initial NAS message (e.g., a service request message or a TA update message) and optionally transmits the initial user data, through an RRC connection setup complete message transmitted using SRB1. If SRB3 is established in an RRC connection establishment procedure, the UE uses SRB3 to transmit the NAS message including the user data. In the RRC connection establishment procedure, an RRC connection setup message that the eNB transmits to the UE may include configuration information about SRB3.

SRB3 according to Proposal A of the present invention may be limited such that SRB3 is applied only to the NAS message including only the user data. For example, when the NAS message includes other control information in addition to the user data, the NAS message is transmitted using SRB1 rather than SRB3. When the RRC message including the NAS message includes other control information generated by an RRC layer in addition to the NAS message, the RRC message is transmitted using SRB1 rather than SRB3. In other cases, i.e., when the RRC message including any NAS message includes neither the RRC control information nor the NAS control information, the RRC message including the NAS message is transmitted through SRB3.

If the UE uses the CIoT technology, the RRC layer of the UE configures SRB3 and uses SRB3 to transmit the NAS message including the user data. In the initial RRC connection setup procedure between the UE and the eNB, the RRC connection request message is transmitted using SRB0 and the RRC connection setup complete message which is transmitted after the RRC connection request message is transmitted using SRB1. That is, an RRC message transmitted through a CCCH uses SRB0. In the RRC connection setup procedure, the initial message including the NAS message uses SRB1. Next, the NAS message including a user message is transmitted using SRB3.

SRB2 may be used to deliver the NAS message when security is configured between the UE and eNB. In this case, the NAS message transmitted through SRB2 does not include the user data.

SRB3 is used to deliver the NAS message when security is not configured between the UE and the eNB. In other words, SRB3 is used to deliver the NAS message until security is activated between the UE and the eNB.

SRB3 is used when the UE desires to use the CIoT technology and the eNB permits use of the CIoT technology. SRB3 may be configured through the RRC connection setup message. When the UE informs the eNB that an RRC connection is set up for the purpose of using CIoT and the eNB determines to set up the RRC connection for the UE, the eNB may provide the UE with configuration information about SRB3 for transmission of the NAS message.

Alternatively, if the eNB permits to cause the UE to use the CIoT technology, SRB3 may be automatically used. That is, when there is an indication that a cell supports the CIoT technology, if RRC connection is set up, the UE may automatically use SRB3.

If security is not configured in an AS and SRB3 is configured, the UE uses SRB3 to transmit the NAS message. In other words, SRB3 is used to deliver the NAS message until security is activated. Since SRB3 is used in a state in which security is not configured and security is also applied to SRB1 after security is activated, SRB1 (and/or SRB2 if SRB2 is present) will be used to deliver the RRC/NAS message after security is activated.

Figure 13:
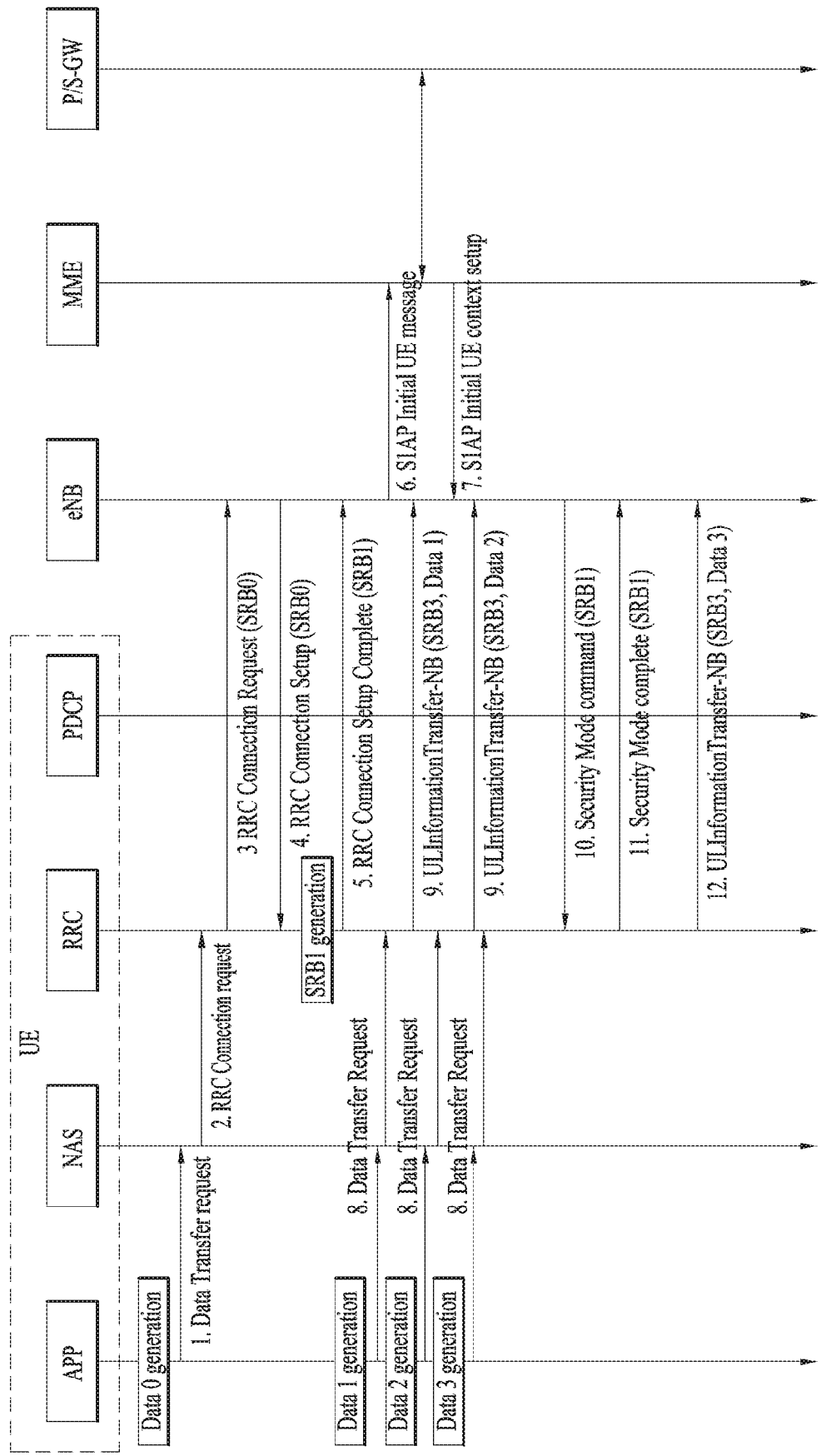
FIG. 13 illustrates CIoT operation according to the present invention.

FIG. 13 illustrates CIoT operation according to the present invention. Particularly, FIG. 13 illustrates CIoT operation based on Proposal A of the present invention.

0. Data is generated by an APP.
1. The APP transfers the generated data to a NAS layer.
2. The NAS layer starts to perform a procedure such as a service request in order to transmit the data to a network.
3. An RRC layer of the UE transmits an RRC connection request message through SRB0 in order to establish RRC connection with the eNB.
4. The eNB transmits an RRC connection setup message through SRB0 as a response to the RRC connection request from the UE. The RRC connection setup message contains configuration information for setting up SRB1. Upon receiving the RRC connection setup message, the UE processes this message and generates SRB3.
5. The UE processes the received RRC connection setup message, configures an RRC connection setup complete message as a response to the RRC connection setup message, and transmits the RRC connection setup complete message through SRB1. Herein, the RRC connection setup complete message may contain higher layer information (e.g., a service request message and a TA update request message).
6. Upon receiving the RRC connection setup complete message in step 5, the eNB transmits a NAS message contained in the RRC connection setup complete message to an MME.
7. The MME configures a context for a corresponding user based on the NAS message received in step 6 and transmits the context to the eNB. Herein, the MME transmits security context information about the user to the eNB.
8. In the middle of steps 5 to 10, the APP of the UE may generate additional data. The NAS message including the data generated in the middle of steps 5 to 10 may be transmitted through SRB3 before security is configured, i.e., before a security mode command/complete procedure is performed.
9. If the RRC layer of the UE is requested by the NAS to transmit a message including user data or a NAS message, the RRC layer of the UE may check whether it is necessary to apply a security context. If it is unnecessary to apply security, the RRC layer transmits the NAS message including the user data through SRB3 which has been configured. If the security context has already been formed, the RRC layer checks whether SRB2 is additionally configured. If SRB2 has been configured, the RRC layer transmits the NAS message through SRB2 and, if no SRB2 is present, the RRC layer transmits the NAS message through SRB1. In this case, the NAS message is included in a message such as a UL information transfer NB.
10. The eNB transmits a security mode command message to the UE based on the information received in step 7 in order to apply security, i.e., ciphering and integrity protection, to a radio link with the UE.
11. The UE configures a security mode complete message as a response to the security mode command message and attempts to transmit the security mode complete message to the eNB through SRB1. Herein, it is assumed that, among legacy NAS messages, messages including data 1 and data 2, for example, have already been transmitted to the eNB and a data block corresponding to data 3 has been stored in a buffer of a lower layer. In this case, the NAS message has been transferred to the lower layer through SRB3 and the security mode complete message is transferred to the lower layer through SRB1. Since SRB1 and SRB3 are different channels, a MAC layer may check priority and determine to preferentially transmit a message through SRB1, i.e., the security mode complete message, over a NAS/RRC message including data 3.
12. After transmitting the security mode complete message through SRB1, the lower layer transmits the NAS message containing remaining user data to the eNB through SRB3.

According to operation of FIG. 12, when only one SRB is used, i.e., only SRB1 is generated, all messages/data should use SRB1. Therefore, when messages/data that should be transmitted remain in a buffer of SRB1, subsequently generated data/messages are not transmitted to a counterpart until all previously generated messages/data are transmitted even though the subsequently generated data/messages have a high priority. Therefore, it is difficult to manage quality of radio data, for example, quality of service (QoS).

Meanwhile, in operation of FIG. 12, if SRB2 is generated to transfer the NAS message or the user data through the NAS, the user data cannot be transmitted through SRB2 until security is applied to SRB2. In this case, data of a higher layer cannot be transmitted during a duration, for example, until a security mode command procedure is applied after the RRC connection setup complete message of the UE is transmitted.

Accordingly, the present invention prevents transmission delay of important data caused by transmission of user data of a higher layer and prevents transmission delay of user data or deterioration of radio channel use efficiency, which occurs when data cannot be transmitted to a radio node even though important data is not transmitted.

According to the present invention, SRB1 and SRB3 belong to different LCGs and BSR is performed based on this.

The network may indicate a value of an LCG to which SRB3 belongs through an SIB or a predesignated value. Then, SRB1 and SRB3 belong to different LCGs and BSR may be performed based on this.

The MME may request that the eNB transmit information about the capacity of a buffer of the UE. That is, for switching operation from an operation mode optimized for IoT to a normal operation mode or vice versa, the MME may request that the eNB transmit information about the amount of data that the UE transmits on UL. The MME may transmit, to the eNB, information as to whether the eNB should report the information about the capacity of the buffer of the UE to the MME when the capacity of the buffer of the UE reaches a certain level, with respect to UEs performing operation using the CIoT technology. The eNB may transmit BSR information to the MME based on the BSR that the UE transmits thereto when the capacity of the buffer reaches a reference value indicated by the MME.

Meanwhile, an RRC entity is unaware of which information is contained in the NAS message provided by a NAS entity as protocols are separated. Therefore, the present invention additionally proposes that, when the NAS entity transmits the NAS message to the RRC entity, the NAS entity inform the RRC entity of information as to whether user data is included in the NAS message, in addition to information about the NAS message. When the NAS entity transmits the NAS message to the RRC entity, the NAS entity may inform the RRC entity of information as to whether control information generated by a NAS layer is included in the NAS message, in addition to the information about the NAS message. Based on this, the RRC entity may determine through which SRB each NAS message should be transmitted.

According to Proposal A of the present invention, if a plurality of SRBs are configured between the UE and the eNB and one of the SRBs is allocated to be used for CIoT usage, for example, transmission/reception of the NAS message including the user data, later generated RRC control information or NAS control information may be transmitted or received earlier than previously generated user data. In this case, the user data may be transmitted through the NAS message between the UE and the MME after a DRB is generated between the UE and the eNB, i.e., even after a transmission path of the user data is changed to direct transmission between the eNB and an S-GW. This may cause a serious problem because the MME cannot perform security processing or compression processing any longer after the DRB is generated. To prevent this problem, when a CIoT mode in which the UE operates is changed to a non-CIoT mode, the UE may delete the NAS message including the user data. The UE may eliminate an SRB configured to transmit the NAS message including the user data, or reset or re-establish each layer for the SRB, for example, a PDCP, RLC, or MAC layer.

When a plurality of SRBs cannot be configured due to limitations of performance of the UE, for example, limitations of processing or limitations of a memory region of the UE, i.e., when the NAS message or RRC message including the user data should be transmitted only using SRB1, the RRC layer of the UE may transmit information as to whether the user data is included in the RRC message or whether RRC control information or NAS control information is included the RRC message upon transmitting the RRC message to the lower layer. Based on this, the lower layer may determine which data should be preferentially transmitted. Particularly, since the MAC entity performs UL transmission using limited radio resources allocated by the eNB, it is necessary to determine to which data transmission the limited radio resources are preferentially allocated. In this determination process, transmission of a message including the RRC control information or the NAS control information takes priority over a message including only the user data, so that a more stable wireless environment may be configured. For example, if it is necessary to retransmit any data blocks with respect to multiple data blocks stacked in a memory of an RLC entity or if it is necessary to determine which data block should be preferentially transmitted among the multiple data blocks, the RLC entity may preferentially transmit a message or data block including the RRC control information or the NAS control information over other messages or data blocks.

Hereinabove, although the present invention has been described with respect to UL operation in which the UE transmits a message to the eNB, the present invention may be similarly applied even to DL operation. For example, the case in which the MME configures a NAS message including user data and transmits the configured NAS message to the eNB and the case in which the MME configures a NAS message without including user data and transmits the configured NAS message to the eNB may be distinguished. When the MME configures a NAS message and transmits the NAS message to the eNB, the MME may transmit information as to whether the NAS message includes the user data and whether the NAS message uses the NAS control information, together with information about the NAS message. Based on this information, when there are multiple NAS messages that should be transmitted to any UE, the eNB may preferentially transmit the NAS message including the NAS control information among the NAS messages over other NAS messages. In this way, the network node rapidly transmits control information to the UE so that switching to a new mode may be rapidly performed.

<Proposal B>

Unlike above-described Proposal A using a newly defined SRB for NAS, Proposal B relates to a method capable of reporting an accurate BSR and a method of preferentially transmitting a specific message, even without introducing the new SRB.

Specifically, Proposal B of the present invention proposes transmitting a BSR to the network as follows when there is user data that the UE should transmit on UL.

If a CIoT function is enabled, when the UE reports, to the network, the amount of user data that the UE is to transmit, the UE reports the amount of data of a logical channel or an LCG different from a logical channel or an LCG to which an SRB configured to transfer an RRC message is mapped, as information about the amount of the user data.

For example, when SRB0, SRB1, and SRB2 are mapped to LCG0, the UE configures a BSR based on the amount of data corresponding to LCG1, LCG2, or LCG3 and transmits the configured BSR to the network. Upon transmitting the BSR to the network, if the RRC message includes only a message generated by the NAS layer and does not include control information generated by the RRC layer, the UE does not include information about LCG0, i.e., information about the amount of data of LCG0, in the BSR. The network may indicate which of LCG1, LCG2, and LCG3 will be used by the UE for the BSR and the UE may represent a value of the indicated LCG in the BSR. That is, in a process in which the network transmits configured information to the UE, the network may indicate information as to which LCG value is used to represent the amount of user data when the UE configures the BSR.

Additionally, upon taking into consideration the fact that an IoT UE generates periodic data which is normally generated and emergency data which is generated in an emergency, the network may inform the UE of an LCG value which is to be used to represent the normally generated periodic data, i.e., data having a normal priority, and an LCG value which is to be used to represent data having a high priority generated in an emergency. In this case, when the UE generates the user data and should transmit the BSR to the network, if the generated data has a normal priority, the UE may transmit information about the capacity of a buffer to the network using the LCG value for normal-priority data indicated by the network and, if the generated data has a high priority, the UE may transmit the information about the capacity of the buffer to the network using the LCG value for high-priority data indicated by the network.

In other words, according to Proposal B of the present invention, the UE configures the BSR and transmits the BSR to the network using an LCG value previously indicated or configured for the user data, instead of configuring the BSR and transmitting the BSR to the network using information about a logical channel over which the user data is actually transmitted and an LCG to which the logical channel is mapped. For example, when an RRC message is transmitted using logical channel 1 and logical channel 1 is mapped to LCG0, when the RRC message includes a NAS message and the NAS message generated by the NAS layer includes the user data, and when the user data is configured to use LCG3, the UE transmits information about the amount of RRC messages or user data, not as information about LCG0 but as information about LCG3, upon transmitting the BSR to the network.

Additionally, taking into consideration the fact that the NAS message does not always include the user data, the NAS layer may inform the RRC layer as to whether the NAS message includes the user data upon delivering the NAS message to the RRC layer. Based on this, the RRC layer performs the above operation only when the NAS message includes the user data. For example, when an RRC message is transmitted using logical channel 1 and logical channel 1 is mapped to LCG0 and when the RRC message includes the NAS message and the user data is not included in the NAS message generated by the NAS layer, the UE indicates information about the amount of data as information about LCG0 and transmits the information upon transmitting the BSR to the network.

Additionally, upon transmitting the NAS message to the RRC layer, the NAS layer may inform the RRC layer as to whether NAS control information is included in the NAS message. Based on this, the RRC layer may perform the above operation when the NAS control information is not included in the NAS message. For example, when an RRC message is transmitted using logical channel 1 and logical channel 1 is mapped to LCG0 and when the RRC message includes the NAS message and the NAS control information is included in the NAS message generated by the NAS layer, the UE indicates information about the amount of data as information about LCG0 and transmits the information, upon transmitting the BSR to the network. If the NAS control information is not included in the NAS message and only user data is included in the NAS message, the UE transmits information about the amount of data using an LCG value other than LCG0, upon transmitting the BSR to the network.

When no RRC control information is included in the RRC message that the UE desires to transmit, when no NAS control information is included in the RRC message, and when user data information is included in the RRC message, the UE uses an LCG value other than an LCG to which a corresponding SRB is mapped according to the proposal of the present invention.

If the network does not provide information as to which LCG should be used, the UE selectively transmits an arbitrary value from among LCG values which are not configured. For example, when the RRC message is configured as logical channel 1 and LCG0 and there is no LCG mapped to LCGs 1/2/3, the UE selects an arbitrary one from among LCGs 1/2/3 and uses the selected LCG.

The network informs the UE of information about which LCG is used to represent the user data as follows. The UE configures an LCG value according to the user data, configures the BSR, and transmits the BSR to the network:

The network may inform the UE of which LCG value should be used through an SIB; and/or The network may inform the UE of an LCG value which is to be used for normal-priority data and an LCG value which is to be used for high-priority data.

If the CIoT function is enabled, when the UE reports, to the network, the amount of the user data that the UE is to transmit, the UE excludes information about the amount of the user data from the amount of data of a logical channel or an LCG to which an SRB configured to transfer the RRC message is mapped.

Alternatively, the UE transmits an RRC connection request message in order to switch from an RRC Idle mode to an RRC Connected mode. In this case, the UE may include information as to whether user data has been generated, in the RRC connection request message. The UE may additionally transmit information about which type of user data has been generated. Additionally, the UE may also transmit information about which priority of the user data has been generated. For example, the UE may provide the network with information about whether the user data is data of an emergency priority or periodically generated data of a normal priority.

The RRC layer informs the MAC layer of information acquired thereby. For example, information about whether the NAS control information is included, whether the RRC control information is included, and whether the user data is included may be included in the generated RRC message. Therefore, as proposed in the present invention, the UE may configure the BSR and transmit the BSR to the network.

The BSR may be configured using the fact that the amount of data generated by the IoT UE is less than the amount of data generated by a normal UE such as a smartphone. Specifically, the IoT UE may configure a BSR of a special form and transmit the BSR to the network. The BSR of the special form may be distinguished by an indicator different from a short BSR or a long BSR. For example, information indicating that the BSR of the special form, i.e., the BSR of the special form generated by the IoT UE, is included may be included in a header of a MAC PDU. For example, the information indicating that the BSR of the special form is included may be indicated using a specific logical channel ID (LCID) value. The BSR of the special form may be used by a UE that is configured to use a CIoT function or an NB-IoT function or a UE using the CIoT function or the NB-IoT function. The BSR of the special form may be used by a UE capable of transmitting and receiving the user data through the NAS message. The BSR of the special form may include the following information or information capable of indicating combination of the following information:

Information about whether an RRC message to be transmitted is present or about the amount of RRC messages to be transmitted, Information about whether a NAS message to be transmitted is present or about the amount of NAS messages to be transmitted, Information about whether user data is present or about the amount of user data, Information about whether a NAS message including user data is present or about the amount of NAS messages including the user data, Information about whether an RRC message including user data is present or about the amount of RRC messages including the user data, Information about whether RRC control information is present in an RRC message and about the amount of the RRC control information, Information about whether NAS control information is present in a NAS message and about the amount of the NAS control information, Information about a priority of the user data FIG. 14 illustrates special formats for a BSR. The UE fills a value according to meaning of each field and transmits the BSR to the network. For example, in a special format of FIG. 14(a), the UE calculates the amount of RRC and NAS control information in an RRC message and includes the calculated amount in the first field. If user data is present, the UE includes information about a priority related to the user data, for example, information about whether the user data has a high priority, in the second field. Finally, the UE includes information about the amount of the user data corresponding to the priority in the third field. In this way, the UE configures a special BSR and transmits the configured BSR to the network.

In order for the UE to transmit the user data, a NAS message is transmitted to the network in a process of transitioning to an RRC Connected mode. Therefore, in the present invention, information that the UE desires to inform the network through the BSR may be transmitted to an MME through the NAS message. Then, the MME transmits this information again to the eNB and the eNB may determine to which UE a radio resource will be preferentially transferred.

An RRC layer is aware of whether the user data is included in the RRC message or the NAS message. Accordingly, in the present invention, the information that the UE desires to inform the network through the BSR may be transmitted to the RRC layer of the eNB through the RRC message. Next, the RRC layer of the eNB may submit this information again to the MAC layer of the eNB and then the MAC layer of the eNB may determine to which UE a radio resource will be preferentially transmitted.

The present invention has been described under the assumption that data of the IoT UE may be divided into data having a high priority and data having a normal priority. However, priorities of the data of the IoT UE may be divided in more detail. Alternatively, information about characteristics of data of each priority may be transmitted to the eNB. For example, information about to what degree a delay is permitted or to what degree a packet error is permitted may be provided to the eNB. The information about characteristics of data of each priority may be indicated by the MME to the eNB or may be configured by an operator and then transmitted to the eNB.

While the present invention has been described with regard to information on priority, a standardized QoS class identifier (QCI) index may be used instead of the priority. For example, a user may inform the network of information about a QCI corresponding to generated user data through a BSR or other methods and then the network may consider this information when allocating a radio resource to the UE. In this process, the information about which application or which data corresponds to which QCI may be previously provided by the network to the UE. Alternatively, a table related to an additional QoS may be defined for IoT instead of the QCI.

The network may transmit, to the UE, information about operation related to a BSR proposed in the present invention or information about whether transmission of a BSR of a special form is permitted. The UE may perform operation according to Proposal B of the present invention only when the operation is permitted through the information.

According to the above-described Proposal A or Proposal B of the present invention, even when the user data is transmitted through an SRB using the NAS message or the RRC message, the RRC control information and the NAS control information may be guaranteed to be preferentially transmitted. In addition, according to the present invention, the UE may accurately inform the network of a buffer status thereof.

Figure 15:
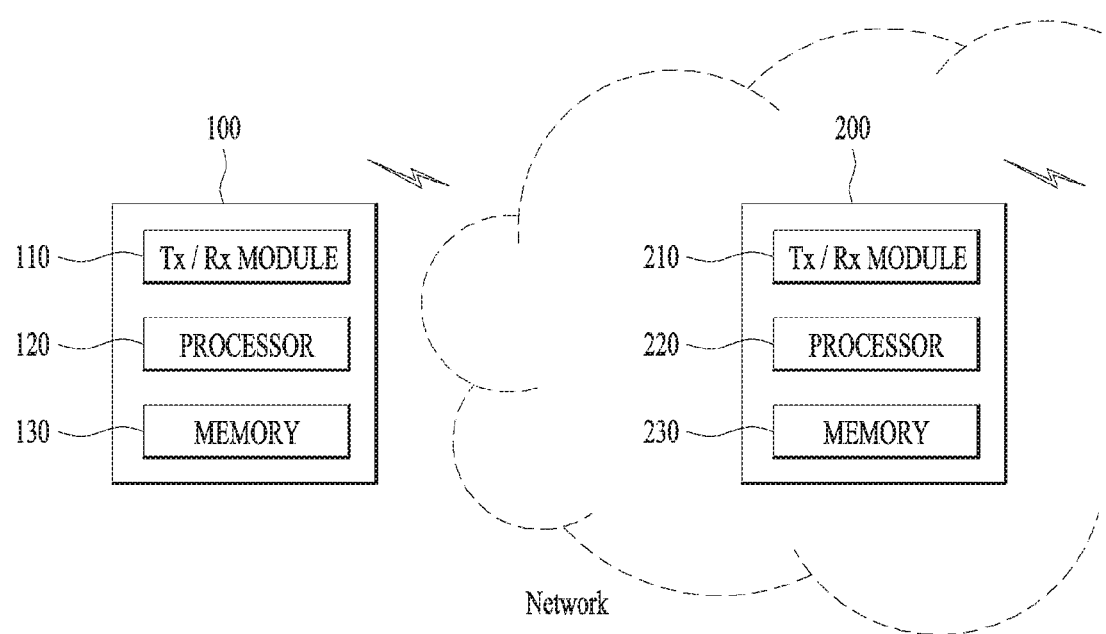
FIG. 15 illustrates a node according to an embodiment of the present invention.

FIG. 15 illustrates configuration of a UE and a network node according to a preferred embodiment of the present invention.

The UE 100 according to the present invention may include a transceiver 110, a processor 120, and a memory 130. The transceiver 110 may be referred to as a radio frequency (RF) unit. The transceiver 110 may be configured to transmit and receive various signals, data and information to and from an external device. The UE 100 may be connected to the storage device by wire and/or wirelessly. The processor 150 may control overall operation of the UE 100, and be configured to calculate and process information for the UE 100 to transmit and receive to and from the external device. In addition, the processor 120 may be configured to perform the proposed operations of the UE. The memory 130 may store the calculated and processed information for a predetermined time, and may be replaced by another constituent such as a buffer (not shown).

Referring to FIG. 15, the network node 200 according to the present invention may include a transceiver 210, a processor 220 and a memory 230. The transceiver 210 may be referred to as an RF unit. The transceiver 210 may be configured to transmit and receive various signals, data and information to and from an external device. The network node 200 may be connected to the storage device by wire and/or wirelessly. The processor 220 may control overall operation of the network node 200, and be configured to calculate and process information for the network node 200 to transmit and receive to and from the external device. In addition, the processor 220 may be configured to perform the proposed operations of the network node. The memory 230 may store the calculated and processed information for a predetermined time, and may be replaced by another constituent such as a buffer (not shown).

For configuration of the UE 100 and the network apparatus, the details described in various embodiments of the present invention may be independently applied or implemented such that two or more embodiments are simultaneously applied. For simplicity, redundant description is omitted.

The embodiments of the present invention may be implemented through various means. For example, the embodiments may be implemented by hardware, firmware, software, or a combination thereof.

When implemented by hardware, a method according to embodiments of the present invention may be embodied as one or more application specific integrated circuits (ASICs), one or more digital signal processors (DSPs), one or more digital signal processing devices (DSPDs), one or more programmable logic devices (PLDs), one or more field programmable gate arrays (FPGAs), a processor, a controller, a microcontroller, a microprocessor, etc.

When implemented by firmware or software, a method according to embodiments of the present invention may be embodied as an apparatus, a procedure, or a function that performs the functions or operations described above. Software code may be stored in a memory unit and executed by a processor. The memory unit is located at the interior or exterior of the processor and may transmit and receive data to and from the processor via various known means.

As described above, the detailed description of the preferred embodiments of the present invention has been given to enable those skilled in the art to implement and practice the invention. Although the invention has been described with reference to exemplary embodiments, those skilled in the art will appreciate that various modifications and variations can be made in the present invention without departing from the spirit or scope of the invention described in the appended claims. Accordingly, the invention should not be limited to the specific embodiments described herein, but should be accorded the broadest scope consistent with the principles and novel features disclosed herein.

INDUSTRIAL APPLICABILITY

The communication method described above is applicable to various wireless communication systems including IEEE 802.16x and 802.11x systems as well as a 3GPP system. Furthermore, the proposed method is applicable to a millimeter wave (mmWave) communication system using an ultrahigh frequency band.

The invention claimed is:

1. A method for a user equipment in a wireless communication system, the method comprising:
transmitting a radio resource control (RRC) connection request message;
receiving an RRC connection setup message in response to the RRC connection request message; and
transmitting, prior to activation of security, a RRC message comprising a non-access stratum (NAS) message, wherein the NAS message comprises user data,
wherein the RRC message is transmitted through a specific signaling radio bearer (SRB) for the RRC message and the NAS message prior to the activation of the security and for narrowband internet of things (NB-IoT),
wherein the specific SRB is established based on the RRC connection setup message, and
wherein the specific SRB is different from SRB1, SRB2 and SRB0.

2. The method of claim 1, wherein the RRC connection request message is transmitted through the SRB0.

3. The method of claim 1, wherein the user equipment for establishing the specific SRB supports the narrowband Internet of things (NB-IoT).

4. The method of claim 1, wherein the specific SRB is established based on configuration information included in the RRC connection setup message.

5. The method of claim 1, wherein, after the security is activated, the NAS message is transmitted through the SRB2 based on the SRB2 being present.

6. A user equipment for transmitting data in a wireless communication system, the user equipment comprising:
a memory; and
at least one processor coupled with the memory and configured to:
transmit a radio resource control (RRC) connection request message;
receive an RRC connection setup message in response to the RRC connection request message; and
transmit, prior to activation of security, a RRC message comprising a non-access stratum (NAS) message, wherein the NAS message comprises user data,
wherein the RRC message is transmitted through a specific signaling radio bearer (SRB) for the RRC message and the NAS message prior to the activation of the security and for narrowband internet of things (NB-IoT),
wherein the specific SRB is established based on the RRC connection setup message, and
wherein the specific SRB is different from SRB1, SRB2, and SRB0.

7. The user equipment of claim 6, wherein the RRC connection request message is transmitted through the SRB0.

8. The user equipment of claim 6, wherein the user equipment for establishing the specific SRB supports the narrowband Internet of things (NB-IoT).

9. The user equipment of claim 6, wherein the specific SRB is established based on configuration information included in the RRC connection setup message.

10. The user equipment of claim 6, wherein, after security is activated, the NAS message is transmitted through the SRB2 based on the SRB2 being present.

11. A method for receiving data by a network node from a user equipment in a wireless communication system, the method comprising:
receiving a radio resource control (RRC) connection request message;
transmitting an RRC connection setup message in response to the RRC connection request message; and
receiving, prior to activation of security, a RRC message comprising a non-access stratum (NAS) message, wherein the NAS message comprises user data,
wherein the RRC message is received through a specific signaling radio bearer (SRB) for the RRC message and the NAS message prior to the activation of the security and for narrowband internet of things (NB-IoT),
wherein the specific SRB is established based on the RRC connection setup message, and
wherein the specific SRB is different from SRB1, SRB2, and SRB0.

12. A network node for receiving data from a user equipment in a wireless communication system, the network node comprising:
a memory; and
at least one processor coupled with the memory and configured to:
receive a radio resource control (RRC) connection request message;
transmit an RRC connection setup message in response to the RRC connection request message; and
receive, prior to activation of security, a RRC message comprising a non-access stratum (NAS) message, wherein the NAS message comprises user data,
wherein the RRC message is received through a specific signaling radio bearer (SRB) for the RRC message and the NAS message prior to the activation of the security,
wherein the specific SRB is established based on the RRC connection setup message, and
wherein the specific SRB is different from signaling radio bearer 1 (SRB1), signaling radio bearer 2 (SRB2), and signaling radio bearer 0 (SRB0).

* * * * *